US008682664B2

(12) United States Patent
Xu et al.

(10) Patent No.: US 8,682,664 B2
(45) Date of Patent: Mar. 25, 2014

(54) METHOD AND DEVICE FOR AUDIO SIGNAL CLASSIFICATION USING TONAL CHARACTERISTIC PARAMETERS AND SPECTRAL TILT CHARACTERISTIC PARAMETERS

(75) Inventors: Lijing Xu, Shenzhen (CN); Shunmei Wu, Shenzhen (CN); Liwei Chen, Shenzhen (CN); Qing Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 69 days.

(21) Appl. No.: 13/246,485

(22) Filed: Sep. 27, 2011

(65) Prior Publication Data

US 2012/0016677 A1 Jan. 19, 2012

Related U.S. Application Data

(63) Continuation of application No. PCT/CN2010/071373, filed on Mar. 27, 2010.

(30) Foreign Application Priority Data

Mar. 27, 2009 (CN) .......................... 2009 1 0129157

(51) Int. Cl.
*G10L 15/08* (2006.01)
*G10L 11/00* (2006.01)

(52) U.S. Cl.
USPC ............................ 704/236; 704/206; 704/231

(58) Field of Classification Search
USPC .................. 704/206–207, 231, 233, 236, 270
See application file for complete search history.

(56) References Cited

U.S. PATENT DOCUMENTS

| | | | | |
|---|---|---|---|---|
| 4,541,110 | A * | 9/1985 | Hopf et al. | 704/231 |
| 5,778,335 | A * | 7/1998 | Ubale et al. | 704/219 |

(Continued)

FOREIGN PATENT DOCUMENTS

| | | | |
|---|---|---|---|
| CN | 101136199 | A | 3/2008 |
| CN | 101236742 | A | 8/2008 |

(Continued)

OTHER PUBLICATIONS

Alexandre et al. "Automatic sound classification for improving speech intelligibility in hearing aids using a layered structure." Inteligent Data Engineering and Automated Learning—IDEAL 2006 (2006), pp. 306-313.*

(Continued)

*Primary Examiner* — James Wozniak
(74) *Attorney, Agent, or Firm* — Leydig, Voit & Mayer, Ltd.

(57) ABSTRACT

The present invention discloses a method and a device for audio signal classification, and relates to the field of communications technologies, which solve a problem of high complexity of type classification of audio signals in the prior art. In the present invention, after an audio signal to be classified is received, a tonal characteristic parameter of the audio signal to be classified, where the tonal characteristic parameter of the audio signal to be classified is in at least one sub-band, is obtained, and a type of the audio signal to be classified is determined according to the obtained characteristic parameter. The present invention is mainly applied to an audio signal classification scenario, and implements audio signal classification through a relatively simple method.

26 Claims, 7 Drawing Sheets

(56) References Cited

U.S. PATENT DOCUMENTS

| | | | | | |
|---|---|---|---|---|---|
| 5,918,203 | A * | 6/1999 | Herre et al. | 704/205 |
| 6,167,372 | A | 12/2000 | Maeda | |
| 6,333,763 | B1 * | 12/2001 | Tanaka | 348/484 |
| 6,871,106 | B1 * | 3/2005 | Ishikawa et al. | 700/94 |
| 7,026,536 | B2 * | 4/2006 | Lu et al. | 84/612 |
| 2002/0161576 | A1 | 10/2002 | Benyassine et al. | |
| 2003/0182105 | A1 | 9/2003 | Sall et al. | |
| 2004/0030550 | A1 * | 2/2004 | Liu et al. | 704/231 |
| 2004/0074378 | A1 * | 4/2004 | Allamanche et al. | 84/616 |
| 2004/0172411 | A1 * | 9/2004 | Herre et al. | 707/104.1 |
| 2004/0267522 | A1 * | 12/2004 | Allamanche et al. | 704/205 |
| 2006/0015333 | A1 | 1/2006 | Gao | |
| 2006/0020958 | A1 * | 1/2006 | Allamanche et al. | 725/19 |
| 2007/0136053 | A1 | 6/2007 | Ebenezer | |
| 2007/0271093 | A1 * | 11/2007 | Wang et al. | 704/210 |
| 2007/0271224 | A1 * | 11/2007 | Essafi et al. | 707/3 |
| 2008/0034396 | A1 * | 2/2008 | Lev | 725/118 |
| 2008/0040123 | A1 | 2/2008 | Shishido | |
| 2009/0192791 | A1 * | 7/2009 | El-Maleh et al. | 704/219 |
| 2009/0297048 | A1 * | 12/2009 | Slotine et al. | 382/224 |
| 2009/0299739 | A1 * | 12/2009 | Chan et al. | 704/225 |
| 2011/0035213 | A1 * | 2/2011 | Malenovsky et al. | 704/208 |
| 2011/0202337 | A1 * | 8/2011 | Fuchs et al. | 704/231 |

FOREIGN PATENT DOCUMENTS

| | | | |
|---|---|---|---|
| CN | 101847412 | B | 2/2012 |
| EP | 1531458 | A1 | 5/2005 |
| JP | 2000099069 | A | 4/2000 |
| JP | 2002344852 | A | 11/2002 |
| JP | 2004240214 | A | 8/2004 |
| JP | 2008015388 | A | 1/2008 |
| WO | 2009/000073 | A1 | 12/2008 |

OTHER PUBLICATIONS

Jarina et al. "Speech-music discrimination from MPEG-1 bitstream." (2001), pp. 1-5.*

1st Office Action in corresponding Australian Patent Application No. 2010227994 (Oct. 16, 2012).

Zhang et al., "Effective Segmentation Based on Vocal Effort Change Point Detection," Jun. 2008, University of Texas at Dallas.

International Searching Authority in corresponding PCT Application No. PCT/CN2010/071373 (Jun. 3, 2010).

Wu, et al., "Real-time Speech/Music Classification Arithmetic Based on Tonality," Audio Engineering, Feb. 2010, vol. 34, No. 2., Voice Technology, Shenzhen, China.

European Patent Office, Extended European Search Report in European Application No. 10 75 5458.6-2225 (Jan. 26, 2012).

International Searching Authority/CN, Written Opinion of the international Searching Authority in International Application No. PCT/CN2010/071373 (Jun. 3, 2010).

1st Office Action in corresponding Japanese Patent Application No. 2012-501127 (Mar. 5, 2013).

1st Office Action in corresponding Korean Patent Application No. 10-2011-7024685 (Apr. 16, 2013).

* cited by examiner

METHOD AND DEVICE FOR AUDIO SIGNAL CLASSIFICATION USING TONAL CHARACTERISTIC PARAMETERS AND SPECTRAL TILT CHARACTERISTIC PARAMETERS

CROSS-REFERENCE TO RELATED APPLICATIONS

This application is a continuation of International Application No. PCT/CN2010/071373, filed on Mar. 27, 2010, which claims priority to Chinese Patent Application No. 200910129157.3, filed on Mar. 27, 2009, both of which are hereby incorporated by reference in their entireties.

FIELD OF THE INVENTION

The present invention relates to the field of communications technologies, and in particular, to a method and a device for audio signal classification.

BACKGROUND OF THE INVENTION

A voice encoder is good at encoding voice-type audio signals under mid-to-low bit rates, while has a poor effect on encoding music-type audio signals. An audio encoder is applicable to encoding of the voice-type and music-type audio signals under a high bit rate, but has an unsatisfactory effect on encoding the voice-type audio signals under the mid-to-low bit rates. In order to achieve a satisfactory encoding effect on audio signals mixed by voice and audio under the mid-to-low bit rates, an encoding process that is applicable to the voice/audio encoder under the mid-to-low bit rates mainly includes: first judging a type of an audio signal by using a signal classification module, and then selecting a corresponding encoding method according to the judged type of the audio signal, and selecting a voice encoder for the voice-type audio signal, and selecting an audio encoder for the music-type audio signal.

In the prior art, a method for judging the type of the audio signal mainly includes:

1. Divide an input signal into a series of overlapping frames by using a window function.

2. Calculate a spectral coefficient of each frame by using Fast Fourier Transform (FFT).

3. Calculate characteristic parameters in five aspects for each segment according to the spectral coefficient of each frame, namely, harmony, noise, tail, drag out and rhythm.

4. Divide the audio signal into six types based on values of the characteristic parameters, including a voice type, a music type, a noise type, a short segment, a segment to be determined, and a short segment to be determined.

During implementation of judging the type of the audio signal, the inventor finds that the prior art at least has the following problems: In the method, characteristic parameters of multiple aspects need to be calculated during a classification process; audio signal classification is complex, which result in high complexity of the classification.

SUMMARY OF THE INVENTION

Embodiments of the present invention provide a method and a device for audio signal classification, so as to reduce complexity of audio signal classification and decrease a calculation amount.

In order to achieve the objectives, the embodiments of the present invention adopt the following technical solutions.

A method for audio signal classification includes:

obtaining a tonal characteristic parameter of an audio signal to be classified, where the tonal characteristic parameter of the audio signal to be classified is in at least one sub-band; and determining, according to the obtained characteristic parameter, a type of the audio signal to be classified.

A device for audio signal classification includes:

a tone obtaining module, configured to obtain a tonal characteristic parameter of an audio signal to be classified, where the tonal characteristic parameter of the audio signal to be classified is in at least one sub-band; and a classification module, configured to determine, according to the obtained characteristic parameter, a type of the audio signal to be classified.

The solutions provided in the embodiments of the present invention adopt a technical means of classifying the audio signal through a tonal characteristic of the audio signal, which overcomes a technical problem of high complexity of audio signal classification in the prior art, thus achieving technical effects of reducing complexity of the audio signal classification and decreasing a calculation amount required during the classification.

BRIEF DESCRIPTION OF THE DRAWINGS

To illustrate the technical solutions according to the embodiments of the present invention more clearly, accompanying drawings required for describing the embodiments are introduced below briefly. Apparently, the accompanying drawings in the following descriptions are merely some embodiments of the present invention, and persons of ordinary skill in the art may obtain other drawings according to the accompanying drawings without creative efforts.

DETAILED DESCRIPTION OF THE EMBODIMENTS

The technical solutions of the present invention are clearly and fully described in the following with reference to the accompanying drawings in the embodiments of the present invention. Obviously, the embodiments to be described are only part of rather than all of the embodiments of the present invention. All other embodiments obtained by persons of ordinary skill in the art based on the embodiments of the present invention without creative efforts shall fall within the protection scope of the present invention.

Embodiments of the present invention provide a method and a device for audio signal classification. A specific execution process of the method includes: obtaining a tonal characteristic parameter of an audio signal to be classified, where the tonal characteristic parameter of the audio signal to be classified is in at least one sub-band; and determining, according to the obtained characteristic parameter, a type of the audio signal to be classified.

The method is implemented through a device including the following modules: a tone obtaining module and a classification module. The tone obtaining module is configured to obtain a tonal characteristic parameter of an audio signal to be classified, where the tonal characteristic parameter of the audio signal to be classified is in at least one sub-band; and the classification module is configured to determine, according to the obtained characteristic parameter, a type of the audio signal to be classified.

In the method and the device for audio signal classification according to the embodiments of the present invention, the type of the audio signal to be classified may be judged through obtaining the tonal characteristic parameter. Aspects of characteristic parameters that need to be calculated are few, and the classification method is simple, thus decreasing a calculation amount during a classification process.

Embodiment 1

Figure 1:
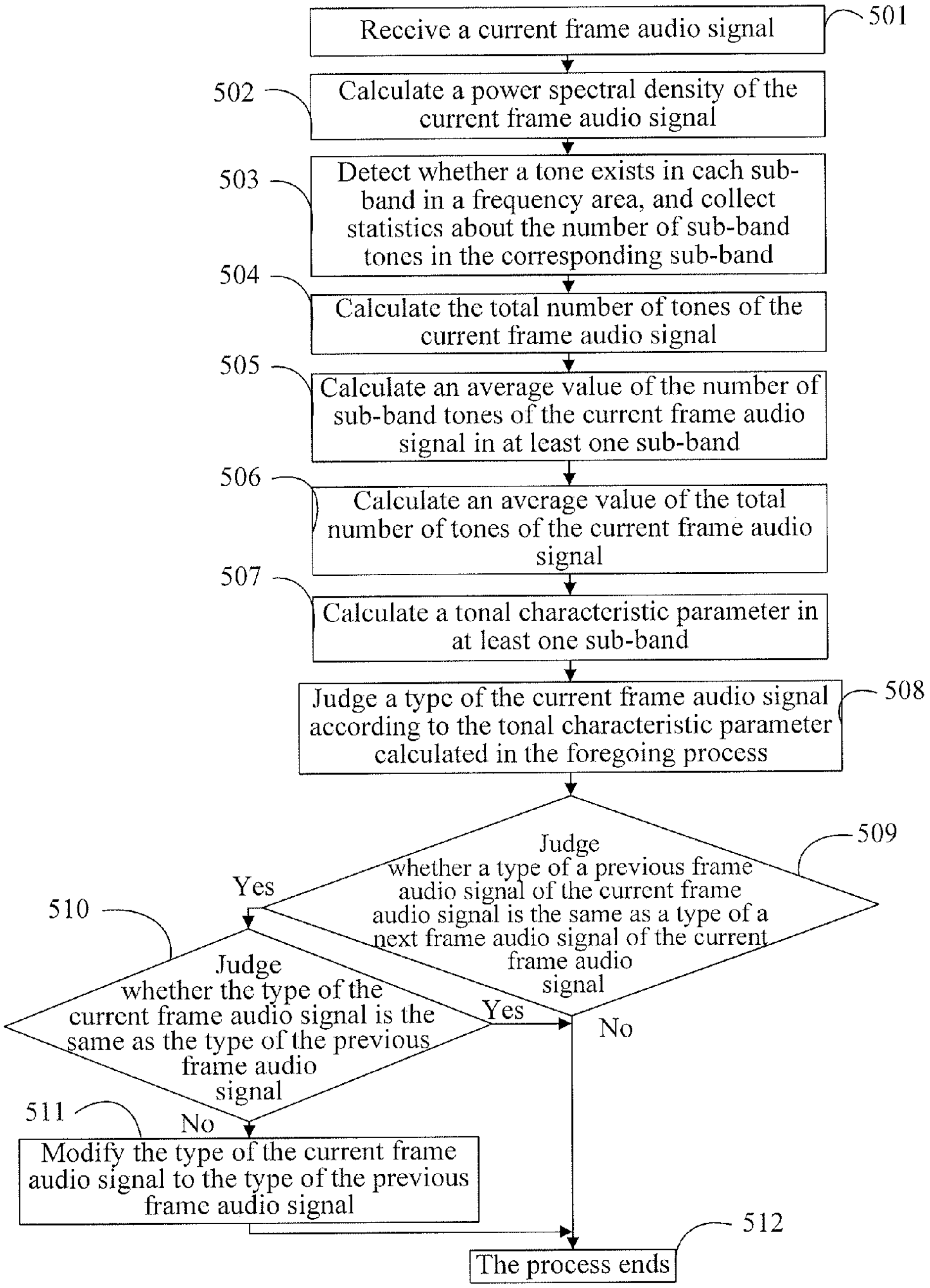
FIG. 1 is a flow chart of a method for audio signal classification according to a first embodiment of the present invention.

This embodiment provides a method for audio signal classification. As shown in FIG. 1, the method includes the following steps.

Step 501: Receive a current frame audio signal, where the audio signal is an audio signal to be classified.

Specifically, it is assumed that a sampling frequency is 48 kHz, and a frame length N=1024 sample points, and the received current frame audio signal is a $k^{th}$ frame audio signal.

A process of calculating a tonal characteristic parameter of the current frame audio signal is described below.

Step 502: Calculate a power spectral density of the current frame audio signal.

Specifically, windowing processing of adding a Hanning window is performed on time-domain data of the $k^{th}$ frame audio signal.

Calculation may be performed through the following Hanning window formula:

$$h(l) = \sqrt{\frac{8}{3}} \cdot 0.5 \cdot \left[1 - \cos\left(2\pi \cdot \frac{l}{N}\right)\right],\ 0 \le l \le N-1 \tag{1}$$

where N represents a frame length, h(l) represents Hanning window data of a first sample point of the $k^{th}$ frame audio signal.

An FFT with a length of N is performed on the time-domain data of the $k^{th}$ frame audio signal after windowing (because the FFT is symmetrical about N/2, an FFT with a length of N/2 is actually calculated), and a $k'^{th}$ power spectral density in the $k^{th}$ frame audio signal is calculated by using an FFT coefficient.

The $k'^{th}$ power spectral density in the $k^{th}$ frame audio signal may be calculated through the following formula:

$$\begin{aligned} X(k') &= 10 \cdot \log_{10}\left|\frac{1}{N}\sum_{l=0}^{N-1}\{h(l)\cdot s(l)\cdot e^{[-jk'l\cdot 2\pi/N]}\}\right|^2 \\ &= 20 \cdot \log_{10}\left|\frac{1}{N}\sum_{l=0}^{N-1}\{h(l)\cdot s(l)\cdot e^{[-jk'l\cdot 2\pi/N]}\}\right| dB \\ &0 \le k' \le N/2,\ 0 \le l \le N-1 \end{aligned} \tag{2}$$

where s(l) represents an original input sample point of the $k^{th}$ frame audio signal, and X(k') represents the $k'^{th}$ power spectral density in the $k^{th}$ frame audio signal.

The calculated power spectral density X(k') is corrected, so that a maximum value of the power spectral density is a reference sound pressure level (96 dB).

Step 503: Detect whether a tone exists in each sub-band of a frequency area by using the power spectral density, collect statistics about the number of tones existing in the corresponding sub-band, and use the number of tones as the number of sub-band tones in the sub-band.

Specifically, the frequency area is divided into four frequency sub-bands, which are respectively represented by $sb_0$, $sb_1$, $sb_2$, and $sb_3$. If the power spectral density X(k') and a certain adjacent power spectral density meet a certain condition, where the certain condition in this embodiment may be a condition shown as the following formula (3), it is considered that a sub-band corresponding to the X(k') has a tone. Collect statistics about the number of tones to obtain the number of sub-band tones $NT_{k\_i}$ in the sub-band, where the $NT_{k\_i}$ represents the number of sub-band tones of the $k^{th}$ frame audio signal in the sub-band sbi (i represents a serial number of the sub-band, and i=0, 1, 2, 3).

$$X(k'-1) < X(k') \le X(k'+1) \text{ and } X(k') - X(k'+j) \ge 7 \text{ dB} \tag{3}$$

where, values of j are stipulated as follows:

$$j = \begin{cases} -2, +2 & \text{for } 2 \le k' < 63 \\ -3, -2, +2, +3 & \text{for } 63 \le k' < 127 \\ -6, \ldots, -2, +2, \ldots, +6 & \text{for } 127 \le k' < 255 \\ -12, \ldots, -2, +2, \ldots, +12 & \text{for } 255 \le k' < 500 \end{cases}$$

In this embodiment, it is known that the number of coefficients (namely the length) of the power spectral density is N/2. Corresponding to the stipulation of the values of j, a meaning of a value interval of k' is further described below.

$sb_0$: corresponding to an interval of 2≤k'<63; a corresponding power spectral density coefficient is $0^{th}$ to $(N/16-1)^{th}$, and a corresponding frequency range is [0 kHz, 3 kHz).

$sb_1$: corresponding to an interval of 63≤k'<127; a corresponding power spectral density coefficient is $N/16^{th}$ to $(N/8-1)^{th}$, and a corresponding frequency range is [3 kHz, 6 kHz).

$sb_2$: corresponding to an interval of 127≤k'<255; a corresponding power spectral density coefficient is $N/8^{th}$ to $(N/4-1)^{th}$, and a corresponding frequency range is [6 kHz, 12 kHz).

$sb_3$: corresponding to an interval of 255≤k'<500; a corresponding power spectral density coefficient is $N/4^{th}$ to $N/2^{th}$, and a corresponding frequency range is [12 kHz, 24 kHz).

$sb_0$ and $sb_1$ correspond to a low-frequency sub-band part; $sb_2$ corresponds to a relatively high-frequency sub-band part; and $sb_3$ corresponds to a high-frequency sub-band part.

A specific process of collecting statistics about the $NT_{k\_i}$ is described as follows.

For the sub-band $sb_0$, values of k' are taken one by one from the interval of 2≤k'<63. For each value of k', judge whether the value meets the condition of the formula (3). After the entire value interval of k' is traversed, collect statistics about the number of values of k' that meet the condition. The number of values of k' that meet the condition is the number of sub-band tones $NT_{k\_0}$ of the $k^{th}$ frame audio signal existing in the sub-band $sb_0$.

For example, if the formula (3) is correct when k'=3, k'=5, and k'=10, it is considered that the sub-band $sb_0$ has three sub-band tones, namely $NT_{k\_0}=3$.

Similarly, for the sub-band $sb_1$, values of k' are taken one by one from the interval of 63≤k'<127. For each value of k', judge whether the value meets the condition of the formula (3). After the entire value interval of k' is traversed, collect statistics about the number of values of k' that meet the condition. The number of values of k' that meet the condition is the number of sub-band tones $NT_{k\_1}$ of the $k^{th}$ frame audio signal existing in the sub-band $sb_1$.

Similarly, for the sub-band $sb_2$, values of k' are taken one by one from the interval of 127≤k'<255. For each value of k', judge whether the value meets the condition of the formula (3). After the entire value interval of k' is traversed, collect statistics about the number of values of k' that meet the condition. The number of values of k' that meet the condition is the number of sub-band tones $NT_{k2}$ of the $k^{th}$ frame audio signal existing in the sub-band $sb_2$.

Statistics about the number of sub-band tones $NT_{k\_3}$ of the $k^{th}$ frame audio signal existing in the sub-band $sb_3$ may also be collected by using the same method.

Step 504: Calculate the total number of tones of the current frame audio signal.

Specifically, a sum of the number of sub-band tones of the $k^{th}$ frame audio signal in the four sub-bands $sb_0$, $sb_1$, $sb_2$ and $sb_3$ is calculated according to the $NT_{k\_i}$, the statistics about which are collected in step 503.

The sum of the number of sub-band tones of the $k^{th}$ frame audio signal in the four sub-bands $sb_0$, $sb_1$, $sb_2$ and $sb_3$ is the number of tones in the $k^{th}$ frame audio signal, which may be calculated through the following formula:

$$NT_{k\_sum} = \sum_{i=0}^{3} NT_{k\_i} \tag{4}$$

where $NT_{k\_sum}$ represents the total number of tones of the $k^{th}$ frame audio signal.

Step 505: Calculate an average value of the number of sub-band tones of the current frame audio signal in the corresponding sub-band among the stipulated number of frames.

Specifically, it is assumed that the stipulated number of frames is M, and the M frames include the $k^{th}$ frame audio signal and (M−1) frames audio signals before the $k^{th}$ frame. The average value of the number of sub-band tones of the $k^{th}$ frame audio signal in each sub-band of the M frames audio signals is calculated according to a relationship between a value of M and a value of k.

The average value of the number of sub-band tones may be calculated through the following formula (5):

$$\text{ave\_NT}_i = \begin{cases} \dfrac{\sum_{j=0}^{k} NT_{j\_i}}{k+1} & \text{if } k < (M-1) \\ \dfrac{\sum_{j=k-M+1}^{k} NT_{j\_i}}{M} & \text{if } k \geq (M-1) \end{cases} \tag{5}$$

where $NT_{j\text{-}i}$ represents the number of sub-band tones of a $j^{th}$ frame audio signal in a sub-band i, and $\text{ave\_NT}_i$ represents the average value of the number of sub-band tones in the sub-band i. Particularly, it can be known from the formula (5) that a proper formula may be selected for calculation according to the relationship between the value of k and the value of M.

Particularly, in this embodiment, according to design requirements, it is unnecessary to calculate the average value of the number of sub-band tones in each sub-band as long as an average value $\text{ave\_NT}_0$ of the number of sub-band tones in the low-frequency sub-band $sb_0$ and an $\text{ave\_NT}_2$ of the number of sub-band tones in the relatively high-frequency sub-band $sb_2$ are calculated.

Step 506: Calculate an average value of the total number of tones of the current frame audio signal among the stipulated number of frames.

Specifically, it is assumed that the stipulated number of frames is M, and the M frames include the $k^{th}$ frame audio signal and (M−1) frames audio signals before the $k^{th}$ frame. The average value of the total number of tones of the $k^{th}$ frame audio signal in each frame audio signal among the M frames audio signals is calculated according to the relationship between the value of M and the value of k.

The total number of tones may be specifically calculated according to the following formula (6):

$$\text{ave\_NT}_{sum} = \begin{cases} \dfrac{\sum_{j=0}^{k} NT_{j\_sum}}{k+1} & \text{if } k < (M-1) \\ \dfrac{\sum_{j=k-M+1}^{k} NT_{j\_sum}}{M} & \text{if } k \geq (M-1) \end{cases} \tag{6}$$

where $NT_{j\_sum}$ represents the total number of tones in the $j^{th}$ frame, and $\text{ave\_NT}_{sum}$ represents the average value of the total number of tones. Particularly, it can be known from the formula (6) that a proper formula may be selected for calculation according to the relationship between the value of k and the value of M.

Step 507: Respectively use a ratio between the calculated average value of the number of sub-band tones in at least one sub-band and the average value of the total number of tones as a tonal characteristic parameter of the current frame audio signal in the corresponding sub-band.

The tonal characteristic parameter may be calculated through the following formula (7):

$$\text{ave\_NT\_ratio}_i = \frac{\text{ave\_NT}_i}{\text{ave\_NT}_{sum}} \tag{7}$$

where $\text{ave\_NT}_i$ represents the average value of the number of sub-band tones in the sub-band i, $\text{ave\_NT}_{sum}$ represents the average value of the total number of tones, and $ave\_NT\_ratio_i$ represents the ratio between the average value of the number of sub-band tones of the $k^{th}$ frame audio signal in the sub-band i and the average value of the total number of tones.

Particularly, in this embodiment, by using the average value $ave\_NT_0$ of the number of sub-band tones in the low-frequency sub-band $sb_0$ and the average value $ave\_NT_2$ of the number of sub-band tones in the relatively high-frequency sub-band $sb_2$ that are calculated in step 505, a tonal characteristic parameter $ave\_NT\_ratio_0$ of the $k^{th}$ frame audio signal in the sub-band $sb_0$ and a tonal characteristic parameter $ave\_NT\_ratio_2$ of the $k^{th}$ frame audio signal in the sub-band $sb_2$ are calculated through the formula (7), and $ave\_NT\_ratio_0$ and $ave\_NT\_ratio_2$ are used as the tonal characteristic parameters of the frame audio signal.

In this embodiment, the tonal characteristic parameters that need to be considered are the tonal characteristic parameters in the low-frequency sub-band and the relatively high-frequency sub-band. However, the design solution of the present invention is not limited to the one in this embodiment, and tonal characteristic parameters in other sub-bands may also be calculated according to the design requirements.

Step 508: Judge a type of the current frame audio signal according to the tonal characteristic parameter calculated in the foregoing process.

Specifically, judge whether the tonal characteristic parameter $ave\_NT\_ratio_0$ in the sub-band $sb_0$ and the tonal characteristic parameter $ave\_NT\_ratio_2$ in the sub-band $sb_2$ that are calculated in step 507 meet a certain relationship with a first parameter and a second parameter. In this embodiment, the certain relationship may be the following relational expression (12):

$$(ave\_NT\_ratio_0>\alpha) \text{ and } (ave\_NT\_ratio_2<\beta) \qquad (12)$$

where $ave\_NT\_ratio_0$ represents the tonal characteristic parameter of the $k^{th}$ frame audio signal in the low-frequency sub-band, $ave\_NT\_ratio_2$ represents the tonal characteristic parameter of the $k^{th}$ frame audio signal in the relatively high-frequency sub-band, $\alpha$ represents a first coefficient, and $\beta$ represents a second coefficient.

If the relational expression (12) is met, it is determined that the $k^{th}$ frame audio signal is a voice-type audio signal; if the relational expression (12) is not met, it is determined that the $k^{th}$ frame audio signal is a music-type audio signal.

A process of smoothing processing on the current frame audio signal is described below.

Step 509: For the current frame audio signal with the type of the audio signal already judged, further judge whether a type of a previous frame audio signal of the current frame audio signal is the same as a type of a next frame audio signal of the current frame audio signal, if the type of the previous frame audio signal of the current frame audio signal is the same as the type of the next frame audio signal of the current frame audio signal, execute step 510; if the type of the previous frame audio signal of the current frame audio signal is different from the type of the next frame audio signal of the current frame audio signal, execute step 512.

Specifically, judge whether the type of the $(k-1)^{th}$ frame audio signal is the same as the type of the $(k+1)^{th}$ frame audio signal. If it is determined that the type of the $(k-1)^{th}$ frame audio signal is the same as the type of the $(k+1)^{th}$ frame audio signal, execute step 510; if it is determined that the type of the $(k-1)^{th}$ frame audio signal is different from the type of the $(k+1)^{th}$ frame audio signal, execute step 512.

Step 510: Judge whether the type of the current frame audio signal is the same as the type of the previous frame audio signal of the current frame audio signal; if it is determined that the type of the current frame audio signal is different from the type of the previous frame audio signal of the current frame audio signal, execute step 511; if it is determined that the type of the current frame audio signal is the same as the type of the previous frame audio signal of the current frame audio signal, execute step 512.

Specifically, judge whether the type of the $k^{th}$ frame audio signal is the same as the type of the $(k-1)^{th}$ frame audio signal. If the judgment result is that the type of the $k^{th}$ frame audio signal is different from the type of the $(k-1)^{th}$ frame audio signal, execute step 511; if the judgment result is that the type of the $k^{th}$ frame audio signal is the same as the type of the $(k-1)^{th}$ frame audio signal, execute step 512.

Step 511: Modify the type of the current frame audio signal to the type of the previous frame audio signal.

Specifically, the type of the $k^{th}$ frame audio signal is modified to the type of the $(k-1)^{th}$ frame audio signal.

During the smoothing processing on the current frame audio signal in this embodiment, specifically, when it is judged whether the smoothing processing needs to be performed on the current frame audio signal, a technical solution of knowing the types of the previous frame and next frame audio signal is adopted. However, the method belongs to a process of knowing related information of the previous and next frames, and adoption of the method for knowing previous frames and next frames is not limited by descriptions of this embodiment. During the process, the solution of specifically knowing types of at least one previous frame audio signal and at least one next frame audio signal is applicable to the embodiments of the present invention.

Step 512: The process ends.

In the prior art, five types of characteristic parameters need to be considered during type classification of audio signals. In the method provided in this embodiment, types of most audio signals may be judged through calculating the tonal characteristic parameters of the audio signals. Compared with the prior art, the classification method is easy, and a calculation amount is small.

Embodiment 2

Figure 2:
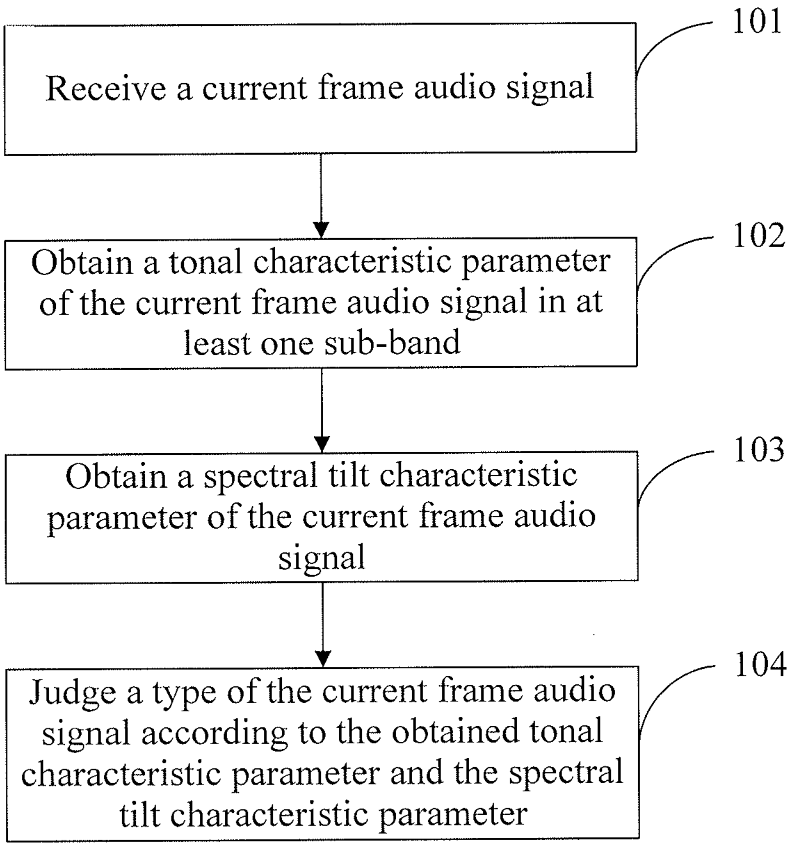
FIG. 2 is a flow chart of a method for audio signal classification according to a second embodiment of the present invention.

This embodiment discloses a method for audio signal classification. As shown in FIG. 2, the method includes:

Step 101: Receive a current frame audio signal, where the audio signal is an audio signal to be classified.

Step 102: Obtain a tonal characteristic parameter of the current frame audio signal, where the tonal characteristic parameter of the current frame audio signal is in at least one sub-band.

Generally, a frequency area is divided into four frequency sub-bands. In each sub-band, the current frame audio signal may obtain a corresponding tonal characteristic parameter. Certainly, according to design requirements, a tonal characteristic parameter of the current frame audio signal in one or two of the sub-bands may be obtained.

Step 103: Obtain a spectral tilt characteristic parameter of the current frame audio signal.

In this embodiment, an execution sequence of step 102 and step 103 is not restricted, and step 102 and step 103 may even be executed at the same time.

Step 104: Judge a type of the current frame audio signal according to at least one tonal characteristic parameter obtained in step 102 and the spectral tilt characteristic parameter obtained in step 103.

In the technical solution provided in this embodiment, a technical means of judging the type of the audio signal according to the tonal characteristic parameter of the audio signal and the spectral tilt characteristic parameter of the audio signal is adopted, which solves a technical problem of complexity in the classification method in which five types of characteristic parameters, such as harmony, noise and rhythm, are required for type classification of audio signals in the prior art, thus achieving technical effects of reducing complexity of the classification method and reducing a classification calculation amount during the audio signal classification.

Embodiment 3

Figure 3A:
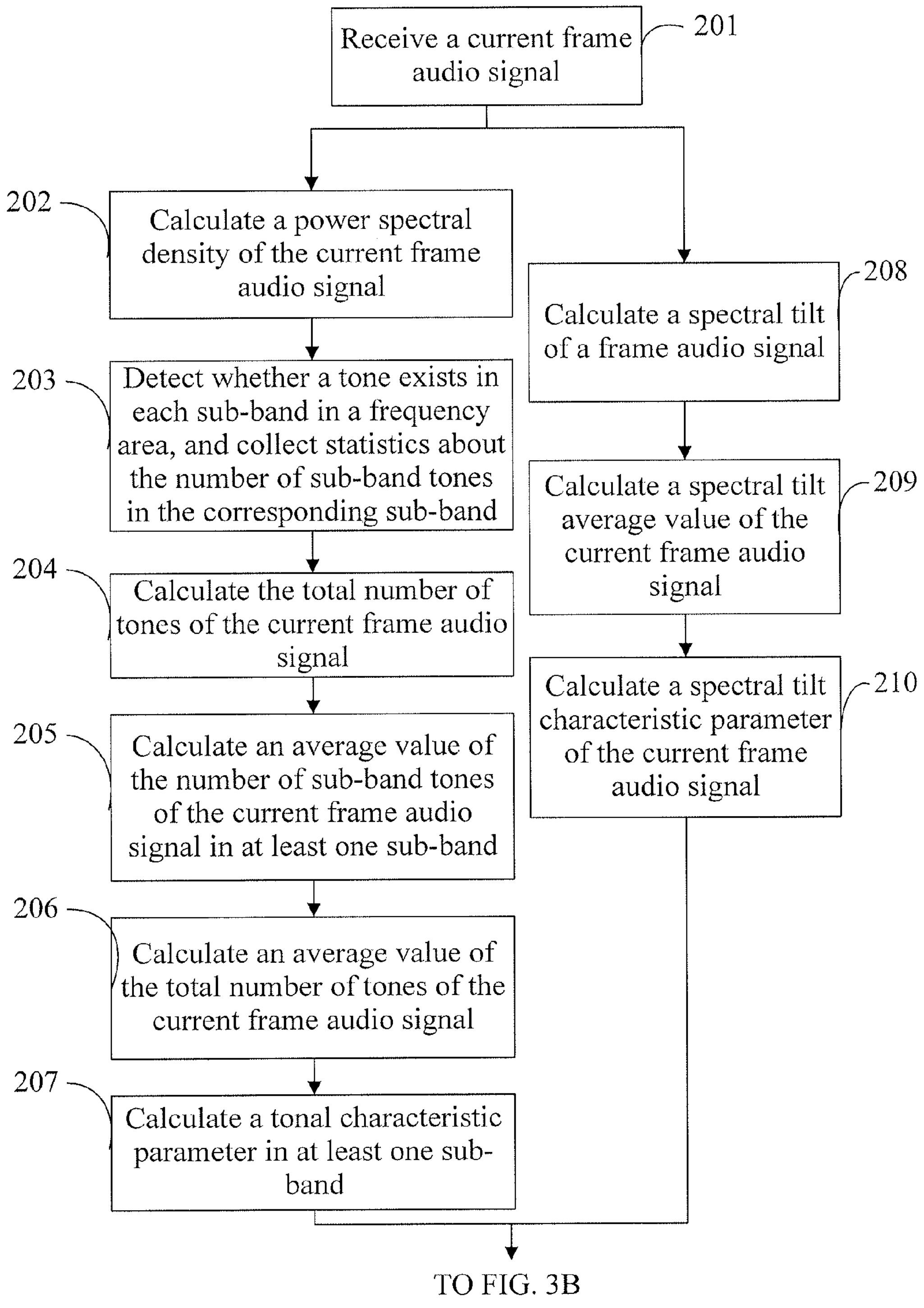
FIGS. 3A and 3B are flow charts of a method for audio signal classification according to a third embodiment of the present invention.
Figure 3B:
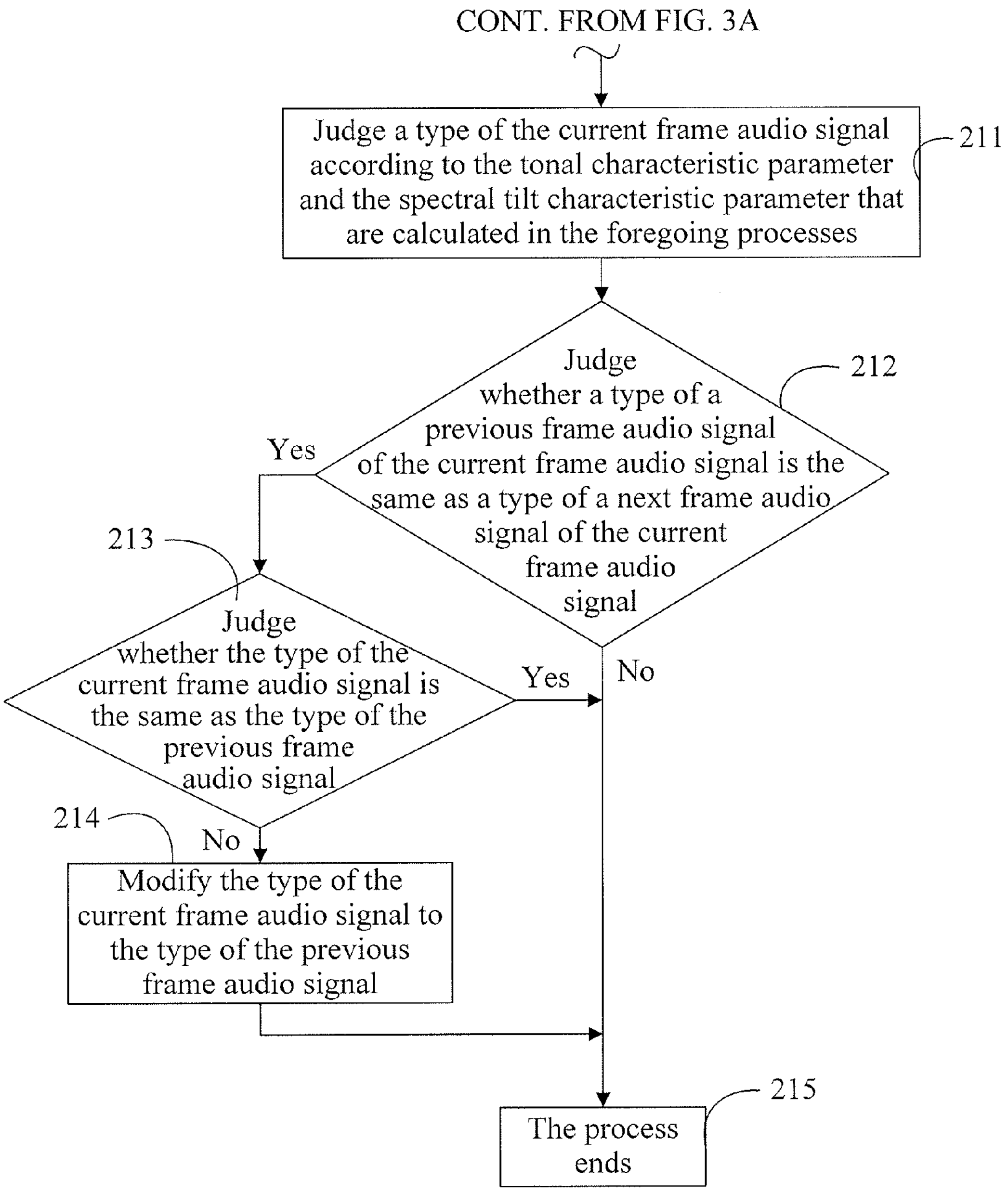

This embodiment provides a method for audio signal classification. As shown in FIGS. 3A and 3B, the method includes the following steps.

Step 201: Receive a current frame audio signal, where the audio signal is an audio signal to be classified.

Specifically, it is assumed that a sampling frequency is 48 kHz, and a frame length N=1024 sample points, and the received current frame audio signal is a $k^{th}$ frame audio signal.

A process of calculating a tonal characteristic parameter of the current frame audio signal is described below.

Step 202: Calculate a power spectral density of the current frame audio signal.

Specifically, windowing processing of adding a Hanning window is performed on time-domain data of the $k^{th}$ frame audio signal.

Calculation may be performed through the following Hanning window formula:

$$h(l) = \sqrt{\frac{8}{3}} \cdot 0.5 \cdot \left[1 - \cos\left(2\pi \cdot \frac{l}{N}\right)\right],\ 0 \le l \le N-1 \tag{1}$$

where N represents a frame length, h(l) represents Hanning window data of a first sample point of the $k^{th}$ frame audio signal.

An FFT with a length of N is performed on the time-domain data of the $k^{th}$ frame audio signal after windowing (because the FFT is symmetrical about N/2, an FFT with a length of N/2 is actually calculated), and a $k'^{th}$ power spectral density in the $k^{th}$ frame audio signal is calculated by using an FFT coefficient.

The $k'^{th}$ power spectral density in the $k^{th}$ frame audio signal may be calculated through the following formula:

$$X(k') = 10 \cdot \log_{10}\left|\frac{1}{N}\sum_{l=0}^{N-1}\left\{h(l) \cdot s(l) \cdot e^{[-jk' \cdot l \cdot 2\pi/N]}\right\}\right|^2 = 20 \cdot \log_{10}\left|\frac{1}{N}\sum_{l=0}^{N-1}\left\{h(l) \cdot s(l) \cdot e^{[-jk' \cdot l \cdot 2\pi/N]}\right\}\right| \text{ dB} \tag{2}$$

$$0 \le k' \le N/2,\ 0 \le l \le N-1$$

where s(l) represents an original input sample point of the $k^{th}$ frame audio signal, and X(k') represents the $k'^{th}$ power spectral density in the $k^{th}$ frame audio signal.

The calculated power spectral density X(k') is corrected, so that a maximum value of the power spectral density is a reference sound pressure level (96 dB).

Step 203: Detect whether a tone exists in each sub-band of a frequency area by using the power spectral density, collect statistics about the number of tones existing in the corresponding sub-band, and use the number of tones as the number of sub-band tones in the sub-band.

Specifically, the frequency area is divided into four frequency sub-bands, which are respectively represented by $sb_0$, $sb_1$, $sb_2$, and $sb_3$. If the power spectral density X(k') and a certain adjacent power spectral density meet a certain condition, where the certain condition in this embodiment may be a condition shown as the following formula (3), it is considered that a sub-band corresponding to the X(k') has a tone. Collect statistics about the number of the tones to obtain the number of sub-band tones $NT_{k\_i}$ in the sub-band, where the $NT_{k\_i}$ represents the number of sub-band tones of the $k^{th}$ frame audio signal in the sub-band sbi (i represents a serial number of the sub-band, and i=0, 1, 2, 3).

$$X(k'-1) < X(k') \le X(\mathbf{5}'+1) \text{ and } X(k') - X(k'+j) \ge 7 \text{ dB} \tag{3}$$

where, values of j are stipulated as follows:

$$j = \begin{cases} -2, +2 & \text{for } 2 \le k' < 63 \\ -3, -2, +2, +3 & \text{for } 63 \le k' < 127 \\ -6, \ldots, -2, +2, \ldots, +6 & \text{for } 127 \le k' < 255 \\ -12, \ldots, -2, +2, \ldots, +12 & \text{for } 255 \le k' < 500 \end{cases}$$

In this embodiment, it is known that the number of coefficients (namely the length) of the power spectral density is N/2. Corresponding to the stipulation of the values of j, a meaning of a value interval of k' is further described below.

$sb_0$: corresponding to an interval of 2≤k'<63; a corresponding power spectral density coefficient is $0^{th}$ to $(N/16-1)^{th}$, and a corresponding frequency range is [0 kHz, 3 kHz).

$sb_1$: corresponding to an interval of 63≤k'<127; a corresponding power spectral density coefficient is $N/16^{th}$ to $(N/8-1)^{th}$, and a corresponding frequency range is [3 kHz, 6 kHz).

$sb_2$: corresponding to an interval of 127≤k'<255; a corresponding power spectral density coefficient is $N/8^{th}$ to $(N/4-1)^{th}$, and a corresponding frequency range is [6 kHz, 12 kHz).

$sb_3$: corresponding to an interval of 255≤k'<500; a corresponding power spectral density coefficient is $N/4^{th}$ to $N/2^{th}$, and a corresponding frequency range is [12 kHz, 24 kHz).

$sb_0$ and $sb_1$ correspond to a low-frequency sub-band part; $sb_2$ corresponds to a relatively high-frequency sub-band part; and $sb_3$ corresponds to a high-frequency sub-band part.

A specific process of collecting statistics about the $NT_{k\_i}$ is as follows.

For the sub-band $sb_0$, values of k' are taken one by one from the interval of 2≤k'<63. For each value of k', judge whether the value meets the condition of the formula (3). After the entire value interval of k' is traversed, collect statistics about the number of values of k' that meet the condition. The number of values of k' that meet the condition is the number of sub-band tones $NT_{k\_0}$ of the $k^{th}$ frame audio signal existing in the sub-band $sb_0$.

For example, if the formula (3) is correct when k'=3, k'=5, and k'=10, it is considered that the sub-band $sb_0$ has three sub-band tones, namely $NT_{k\_0}=3$.

Similarly, for the sub-band $sb_1$, values of k' are taken one by one from the interval of 63≤k'<127. For each value of k', judge whether the value meets the condition of the formula (3). After the entire value interval of k' is traversed, collect statistics about the number of values of k' that meet the condition. The number of values of k' that meet the condition is the number of sub-band tones $NT_{k\_1}$ of the $k^{th}$ frame audio signal existing in the sub-band $sb_1$.

Similarly, for the sub-band $sb_2$, values of k' are taken one by one from the interval of 127≤k'<255. For each value of k', judge whether the value meets the condition of the formula (3). After the entire value interval of k' is traversed, collect statistics about the number of values of k' that meet the condition. The number of values of k' that meet the condition is the number of sub-band tones $NT_{k\_2}$ of the $k^{th}$ frame audio signal existing in the sub-band $sb_2$.

Statistics about the number of sub-band tones $NT_{k\_3}$ of the $k^{th}$ frame audio signal existing in the sub-band $sb_3$ may also be collected by using the same method.

Step 204: Calculate the total number of tones of the current frame audio signal.

Specifically, a sum of the number of sub-band tones of the $k^{th}$ frame audio signal in the four sub-bands $sb_0$, $sb_1$, $sb_2$ and $sb_3$ is calculated according to the $NT_{k\_i}$, the statistics about which are collected in step 203.

The sum of the number of sub-band tones of the $k^{th}$ frame audio signal in the four sub-bands $sb_0$, $sb_1$, $sb_2$ and $sb_3$ is the number of tones in the $k^{th}$ frame audio signal, which may be calculated through the following formula:

$$NT_{k\_sum} = \sum_{i=0}^{3} NT_{k\_i} \tag{4}$$

where $NT_{k\_sum}$ represents the total number of tones of the $k^{th}$ frame audio signal.

Step 205: Calculate an average value of the number of sub-band tones of the current frame audio signal in the corresponding sub-band among the speculated number of frames.

Specifically, it is assumed that the stipulated number of frames is M, and the M frames include the $k^{th}$ frame audio signal and (M−1) frames audio signals before the $k^{th}$ frame. The average value of the number of sub-band tones of the $k^{th}$ frame audio signal in each sub-band of the M frames audio signals is calculated according to a relationship between a value of M and a value of k.

The average value of the number of sub-band tones may be calculated through the following formula (5):

$$\text{ave\_NT}_i = \begin{cases} \dfrac{\sum_{j=0}^{k} NT_{j\_i}}{k+1} & \text{if } k < (M-1) \\ \dfrac{\sum_{j=k-M+1}^{k} NT_{j\_i}}{M} & \text{if } k \geq (M-1) \end{cases} \tag{5}$$

where $NT_{j\text{-}i}$ represents the number of sub-band tones of a $j^{th}$ frame audio signal in a sub-band i, and $\text{ave\_NT}_i$ represents the average value of the number of sub-band tones in the sub-band i. Particularly, it can be known from the formula (5) that a proper formula may be selected for calculation according to the relationship between the value of k and the value of M.

Particularly, in this embodiment, according to design requirements, it is unnecessary to calculate the average value of the number of sub-band tones in each sub-band as long as an average value $\text{ave\_NT}_0$ of the number of sub-band tones in the low-frequency sub-band $sb_0$ and an $\text{ave\_NT}_2$ of the number of sub-band tones in the relatively high-frequency sub-band $sb_2$ are calculated.

Step 206: Calculate an average value of the total number of tones of the current frame audio signal in the stipulated number of frames.

Specifically, it is assumed that the stipulated number of frames is M, and the M frames include the $k^{th}$ frame audio signal and (M−1) frames audio signals before the $k^{th}$ frame. The average value of the total number of tones of the $k^{th}$ frame audio signal in each frame audio signal among the M frames audio signals is calculated according to the relationship between the value of M and the value of k.

The total number of tones may be specifically calculated according to the following formula (6):

$$\text{ave\_NT}_{sum} = \begin{cases} \dfrac{\sum_{j=0}^{k} NT_{j\_sum}}{k+1} & \text{if } k < (M-1) \\ \dfrac{\sum_{j=k-M+1}^{k} NT_{j\_sum}}{M} & \text{if } k \geq (M-1) \end{cases} \tag{6}$$

where $NT_{j\_sum}$ represents the total number of tones in the $j^{th}$ frame, and $\text{ave\_NT}_{sum}$ represents the average value of the total number of tones. Particularly, it can be known from the formula (6) that a proper formula may be selected for calculation according to the relationship between the value of k and the value of M.

Step 207: Respectively use a ratio between the calculated average value of the number of sub-band tones in at least one sub-band and the average value of the total number of tones as a tonal characteristic parameter of the current frame audio signal in the corresponding sub-band.

The tonal characteristic parameter may be calculated through the following formula (7):

$$\text{ave\_NT\_ratio}_i = \frac{\text{ave\_NT}_i}{\text{ave\_NT}_{sum}} \tag{7}$$

where $\text{ave\_NT}_i$ represents the average value of the number of sub-band tones in the sub-band i, $\text{ave\_NT}_{sum}$ represents the average value of the total number of tones, and $\text{ave\_NT\_ratio}_i$ represents the ratio between the average value of the number of sub-band tones of the $k^{th}$ frame audio signal in the sub-band i and the average value of the total number of tones.

Particularly, in this embodiment, by using the average value $\text{ave\_NT}_0$ of the number of sub-band tones in the low-frequency sub-band $sb_0$ and the average value $\text{ave\_NT}_2$ of the number of sub-band tones in the relatively high-frequency sub-band $sb_2$ that are calculated in step 205, a tonal characteristic parameter $\text{ave\_NT\_ratio}_0$ of the $k^{th}$ frame audio signal in the sub-band $sb_0$ and a tonal characteristic parameter $\text{ave\_NT\_ratio}_2$ of the $k^{th}$ frame audio signal in the sub-band $sb_2$ are calculated through the formula (7), and $\text{ave\_NT\_ratio}_0$ and $\text{ave\_NT\_ratio}_2$ are used as the tonal characteristic parameters of the $k^{th}$ frame audio signal.

In this embodiment, the tonal characteristic parameters that need to be considered are the tonal characteristic parameters in the low-frequency sub-band and the relatively high-frequency sub-band. However, the design solution of the present invention is not limited to the one in this embodiment, and tonal characteristic parameters in other sub-bands may also be calculated according to the design requirements.

A process of calculating a spectral tilt characteristic parameter of the current frame audio signal is described below.

Step 208: Calculate a spectral tilt of one frame audio signal.

Specifically, calculate a spectral tilt of the $k^{th}$ frame audio signal.

The spectral tilt of the $k^{th}$ frame audio signal may be calculated through the following formula (8):

$$\text{spec\_tilt}_k = \frac{r(1)}{r(0)} = \frac{\sum_{n=(k-1)\cdot N}^{k\cdot N-1} [s(n)\cdot s(n-1)]}{\sum_{n=(k-1)\cdot N}^{k\cdot N-1} [s(n)\cdot s(n)]} \quad (8)$$

where s(n) represents an $n^{th}$ time-domain sample point of the $k^{th}$ frame audio signal, r represents an autocorrelation parameter, and $\text{spec\_tilt}_k$ represents the spectral tilt of the $k^{th}$ frame audio signal.

Step 209: Calculate, according to the spectral tilt of one frame calculated above, a spectral tilt average value of the current frame audio signal in the stipulated number of frames.

Specifically, it is assumed that the stipulated number of frames is M, and the M frames include the $k^{th}$ frame audio signal and (M−1) frames audio signals before the $k^{th}$ frame. The average spectral tilt of each frame audio signal among the M frames audio signals, namely the spectral tilt average value in the M frames audio signals, is calculated according to the relationship between the value of M and the value of k.

The spectral tilt average value may be calculated through the following formula (9):

$$\text{ave\_spec\_tilt} = \begin{cases} \dfrac{\sum_{j=0}^{k} \text{spec\_tilt}_j}{k+1} & \text{if } k < (M-1) \\ \dfrac{\sum_{j=k-M+1}^{k} \text{spec\_tilt}_j}{M} & \text{if } k \geq (M-1) \end{cases} \quad (9)$$

where k represents a frame number of the current frame audio signal, M represents the stipulated number of frames, $\text{spec\_tilt}_j$ represents the spectral tilt of the $j^{th}$ frame audio signal, and ave_spec_tilt represents the spectral tilt average value. Particularly, it can be known from the formula (9) that a proper formula may be selected for calculation according to the relationship between the value of k and the value of M.

Step 210: Use a mean-square error between the spectral tilt of at least one audio signal and the calculated spectral tilt average value as a spectral tilt characteristic parameter of the current frame audio signal.

Specifically, it is assumed that the stipulated number of frames is M, and the M frames include the $k^{th}$ frame audio signal and (M−1) frames audio signals before the $k^{th}$ frame. The mean-square error between the spectral tilt of at least one audio signal and the spectral tilt average value is calculated according to the relationship between the value of M and the value of k. The mean-square error is the spectral tilt characteristic parameter of the current frame audio signal.

The spectral tilt characteristic parameter may be calculated through the following formula (10):

$$\text{dif\_spec\_tilt} = \begin{cases} \dfrac{\sum_{j=0}^{k} [(\text{spec\_tilt}_j - \text{ave\_spec\_tilt})^2]}{k+1} & \text{if } k < (M-1) \\ \dfrac{\sum_{j=k-M+1}^{K} [(\text{spec\_tilt}_j - \text{ave\_spec\_tilt})^2]}{M} & \text{if } k \geq (M-1) \end{cases} \quad (10)$$

where k represents the frame number of the current frame audio signal, ave_spec_tilt represents the spectral tilt average value, and dif_spec_tilt represents the spectral tilt characteristic parameter. Particularly, it can be known from the formula (10) that a proper formula may be selected for calculation according to the relationship between the value of k and the value of M.

An execution sequence of a process of calculating the tonal characteristic parameter (step 202 to step 207) and a process of calculating the spectral tilt characteristic parameter (step 208 to step 210) in the foregoing description of this embodiment is not restricted, and the two processes may even be executed at the same time.

Step 211: Judge a type of the current frame audio signal according to the tonal characteristic parameter and the spectral tilt characteristic parameter that are calculated in the foregoing processes.

Specifically, judge whether the tonal characteristic parameter $\text{ave\_NT\_ratio}_0$ in the sub-band $sb_0$ and the tonal characteristic parameter $\text{ave\_NT\_ratio}_2$ in the sub-band $sb_2$ that are calculated in step 207, and the spectral tilt characteristic parameter dif_spec_tilt calculated in step 210 meet a certain relationship with a first parameter, a second parameter and a third parameter. In this embodiment, the certain relationship may be the following relational expression (11):

$$(ave\_NT\_\text{ratio}_0>\alpha) \text{ and } (ave\_NT\_\text{ratio}_2<\beta) \text{ and } (dif\_spec\_\text{tilt}>\gamma) \quad (11)$$

where $\text{ave\_NT\_ratio}_0$ represents the tonal characteristic parameter of the $k^{th}$ frame audio signal in the low-frequency sub-band, $\text{ave\_NT\_ratio}_2$ represents the tonal characteristic parameter of the $k^{th}$ frame audio signal in the relatively high-frequency sub-band, dif_spec_tilt represents the spectral tilt characteristic parameter of the $k^{th}$ frame audio signal, a represents a first coefficient, γ represents a second coefficient, and γ represents a third coefficient.

If the certain relationship, namely the relational expression (11), is met, it is determined that the $k^{th}$ frame audio signal is a voice-type audio signal; if the relational expression (11) is not met, it is determined that the $k^{th}$ frame audio signal is a music-type audio signal.

A process of smoothing processing on the current frame audio signal is described below.

Step 212: For the current frame audio signal with the type of the audio signal already judged, further judge whether a type of a previous frame audio signal of the current frame audio signal is the same as a type of a next frame audio signal of the current frame audio signal, if the type of the previous frame audio signal of the current frame audio signal is the same as the type of the next frame audio signal of the current frame audio signal, execute step 213; if the type of the previous frame audio signal of the current frame audio signal is different from the type of the next frame audio signal of the current frame audio signal, execute step 215.

Specifically, judge whether the type of the $(k-1)^{th}$ frame audio signal is the same as the type of the $(k+1)^{th}$ frame audio signal. If the judgment result is that the type of the $(k-1)^{th}$ frame audio signal is the same as the type of the $(k+1)^{th}$ frame audio signal, execute step 213; if the judgment result is that the type of the $(k-1)^{th}$ frame audio signal is different from the type of the $(k+1)^{th}$ frame audio signal, execute step 215.

Step 213: Judge whether the type of the current frame audio signal is the same as the type of the previous frame audio signal of the current frame audio signal; if it is determined that the type of the current frame audio signal is different from the type of the previous frame audio signal of the current frame audio signal, execute step 214; if it is determined that the type of the current frame audio signal is the same as the type of the previous frame audio signal of the current frame audio signal, execute step 215.

Specifically, judge whether the type of the $k^{th}$ frame audio signal is the same as the type of the $(k-1)^{th}$ frame audio signal. If the judgment result is that the type of the $k^{th}$ frame audio signal is different from the type of the $(k-1)^{th}$ frame audio signal, execute step 214; if the judgment result is that the type of the $k^{th}$ frame audio signal is the same as the type of the $(k-1)^{th}$ frame audio signal, execute step 215.

Step 214: Modify the type of the current frame audio signal to the type of the previous frame audio signal.

Specifically, the type of the $k^{th}$ frame audio signal is modified to the type of the $(k-1)^{th}$ frame audio signal.

During the smoothing processing on the current frame audio signal described in this embodiment, when the type of the current frame audio signal, namely the type of the $k^{th}$ frame audio signal is judged in step 212, the next step 213 cannot be performed until the type of the $(k+1)^{th}$ frame audio signal is judged. It seems that a frame of delay is introduced here to wait for the type of the $(k+1)^{th}$ frame audio signal to be judged. However, generally, an encoder algorithm has a frame of delay when encoding each frame audio signal, and this embodiment happens to utilize the frame of delay to carry out the smoothing processing, which not only avoids misjudgment of the type of the current frame audio signal, but also prevents the introduction of an extra delay, so as to achieve a technical effect of real-time classification of the audio signal.

When requirements on delay are not restrict, during the smoothing processing on the current frame audio signal in this embodiment, it may also be decided whether the smoothing processing needs to be performed on a current audio signal through judging types of previous three frames and types of next three frames of the current audio signal, or types of previous five frames and types of next five frames of the current audio signal. The specific number of the related previous and next frames that need to be known is not limited by the description in this embodiment. Because more related information of previous and next frames is known, an effect of the smoothing processing may be better.

Step 215: The process ends.

Compared with the prior art in which type classification of audio signals is implemented according to five types of characteristic parameters, the method for audio signal classification provided in this embodiment may implement the type classification of audio signals merely according to two types of characteristic parameters. A classification algorithm is simple; complexity is low; and a calculation amount during a classification process is reduced. At the same time, in the solution of this embodiment, a technical means of performing smoothing processing on the classified audio signal is also adopted, so as to achieve beneficial effects of improving a recognition rate of the type of the audio signal, and giving full play to functions of a voice encoder and an audio encoder during a subsequent encoding process.

Embodiment 4

Figure 4:
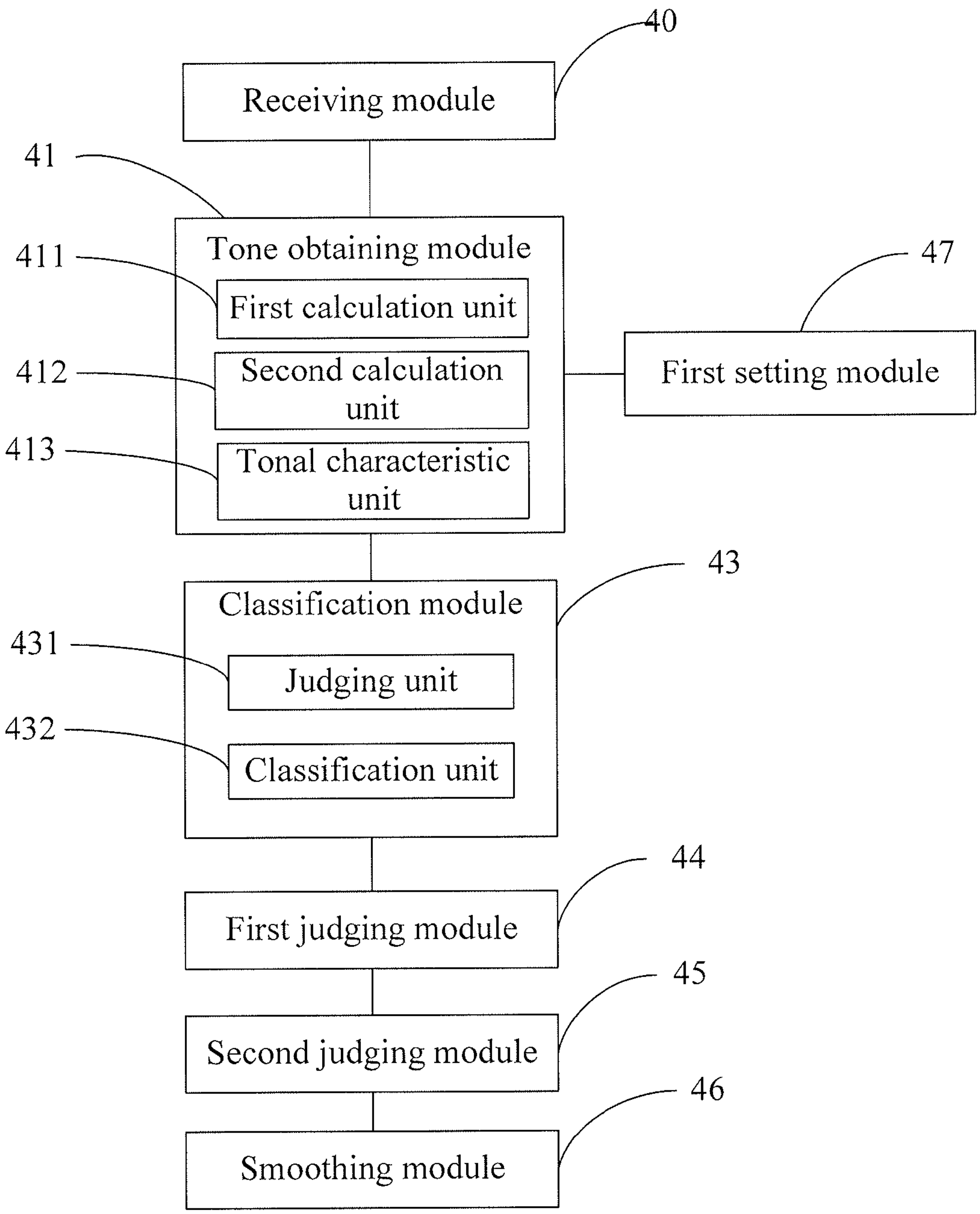
FIG. 4 is a block diagram of a device for audio signal classification according to a fourth embodiment of the present invention.

Corresponding to the first embodiment, this embodiment specifically provides a device for audio signal classification. As shown in FIG. 4, the device includes a receiving module 40, a tone obtaining module 41, a classification module 43, a first judging module 44, a second judging module 45, a smoothing module 46 and a first setting module 47.

The receiving module 40 is configured to receive a current frame audio signal, where the current frame audio signal is an audio signal to be classified. The tone obtaining module 41 is configured to obtain a tonal characteristic parameter of the audio signal to be classified, where the tonal characteristic parameter of the audio signal to be classified is in at least one sub-band. The classification module 43 is configured to determine, according to the tonal characteristic parameter obtained by the tone obtaining module 41, a type of the audio signal to be classified. The first judging module 44 is configured to judge whether a type of at least one previous frame audio signal of the audio signal to be classified is the same as a type of at least one corresponding next frame audio signal of the audio signal to be classified after the classification module 43 classifies the type of the audio signal to be classified. The second judging module 45 is configured to judge whether the type of the audio signal to be classified is different from the type of the at least one previous frame audio signal when the first judging module 44 determines that the type of the at least one previous frame audio signal of the audio signal to be classified is the same as the type of the at least one corresponding next frame audio signal of the audio signal to be classified. The smoothing module 46 is configured to perform smoothing processing on the audio signal to be classified when the second judging module 45 determines that the type of the audio signal to be classified is different from the type of the at least one previous frame audio signal. The first setting module 47 is configured to preset the stipulated number of frames for calculation.

In this embodiment, if the tonal characteristic parameter in at least one sub-band obtained by the tone obtaining module 41 is: a tonal characteristic parameter in a low-frequency sub-band and a tonal characteristic parameter in a relatively high-frequency sub-band, the classification module 43 includes a judging unit 431 and a classification unit 432.

The judging unit 431 is configured to judge whether the tonal characteristic parameter of the audio signal to be classified, where the tonal characteristic parameter of the audio signal to be classified is in the low-frequency sub-band, is greater than a first coefficient, and whether the tonal characteristic parameter in the relatively high-frequency sub-band is smaller than a second coefficient. The classification unit 432 is configured to determine that the type of the audio signal to be classified is a voice type when the judging unit 431 determines that the tonal characteristic parameter of the audio signal to be classified, where the tonal characteristic parameter of the audio signal to be classified is in the low-frequency sub-band, is greater than the first coefficient and the tonal characteristic parameter in the relatively high-frequency band is smaller than the second coefficient, and determine that the type of the audio signal to be classified is a music type when the judging unit 431 determines that the tonal characteristic parameter of the audio signal to be classified, where the tonal characteristic parameter of the audio signal to be classified is in the low-frequency sub-band, is not greater than the first coefficient or the tonal characteristic parameter in the relatively high-frequency band is not smaller than the second coefficient.

The tone obtaining module 41 is configured to calculate the tonal characteristic parameter according to the number of tones of the audio signal to be classified, where the number of tones of the audio signal to be classified is in at least one sub-band, and the total number of tones of the audio signal to be classified.

Further, the tone obtaining module 41 in this embodiment includes a first calculation unit 411, a second calculation unit 412 and a tonal characteristic unit 413.

The first calculation unit 411 is configured to calculate an average value of the number of sub-band tones of the audio signal to be classified, where the number of sub-band tones of the audio signal to be classified is in at least one sub-band. The second calculation unit 412 is configured to calculate an average value of the total number of tones of the audio signal to be classified. The tonal characteristic unit 413 is configured to respectively use a ratio between the average value of the number of sub-band tones in at least one sub-band and the average value of the total number of tones as a tonal characteristic parameter of the audio signal to be classified, where the tonal characteristic parameter of the audio signal to be classified is in the corresponding sub-band.

The calculating, by the first calculation unit 411, the average value of the number of sub-band tones of the audio signal to be classified, where the number of sub-band tones of the audio signal to be classified is in at least one sub-band, includes: calculating the average value of the number of sub-band tones in one sub-band according to a relationship between the stipulated number of frames for calculation, where the stipulated number of frames for calculation is set by the first setting module 47, and a frame number of the audio signal to be classified.

The calculating, by second calculation unit 412, the average value of the total number of tones of the audio signal to be classified includes: calculating the average value of the total number of tones according to the relationship between the stipulated number of frames for calculation, where the stipulated number of the frames for calculation is set by the first setting module, and the frame number of the audio signal to be classified.

With the device for audio signal classification provided in this embodiment, a technical means of obtaining the tonal characteristic parameter of the audio signal is adopted, so as to achieve a technical effect of judging types of most audio signals, reducing complexity of a classification method for audio signal classification, and meanwhile decreasing a calculation amount during the audio signal classification.

Embodiment 5

Figure 5:
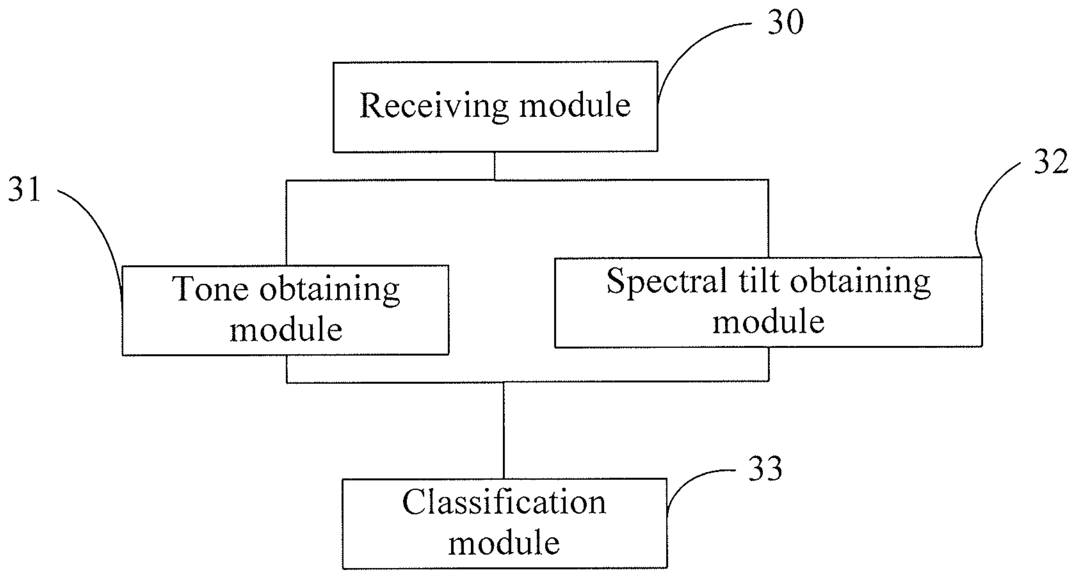
FIG. 5 is a block diagram of a device for audio signal classification according to a fifth embodiment of the present invention.

Corresponding to the method for audio signal classification in the second embodiment, this embodiment discloses a device for audio signal classification. As shown in FIG. 5, the device includes a receiving module 30, a tone obtaining module 31, a spectral tilt obtaining module 32 and a classification module 33.

The receiving module 30 is configured to receive a current frame audio signal. The tone obtaining module 31 is configured to obtain a tonal characteristic parameter of an audio signal to be classified, where the tonal characteristic parameter of the audio signal to be classified is in at least one sub-band. The spectral tilt obtaining module 32 is configured to obtain a spectral tilt characteristic parameter of the audio signal to be classified. The classification module 33 is configured to determine a type of the audio signal to be classified according to the tonal characteristic parameter obtained by the tone obtaining module 31 and the spectral tilt characteristic parameter obtained by the spectral tilt obtaining module 32.

In the prior art, multiple aspects of characteristic parameters of audio signals need to be considered during audio signal classification, which leads to high complexity of classification and a great calculation amount. However, in the solution provided in this embodiment, during the audio signal classification, the type of the audio signal may be recognized merely according to two characteristic parameters, namely the tonal characteristic parameter of the audio signal and the spectral tilt characteristic parameter of the audio signal, so that the audio signal classification becomes easy, and the calculation amount during the classification is also decreased.

Embodiment 6

Figure 6:
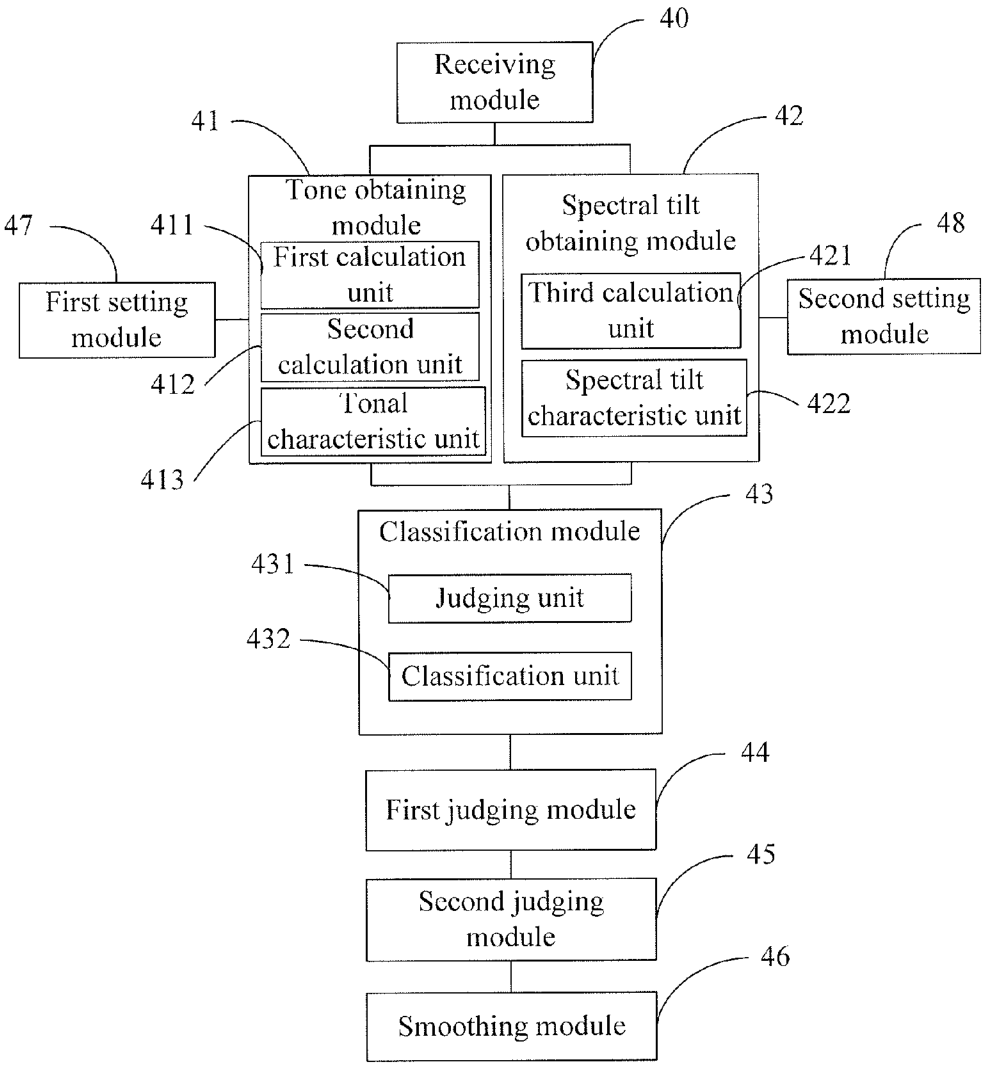
FIG. 6 is a block diagram of a device for audio signal classification according to a sixth embodiment of the present invention.

This embodiment specifically provides a device for audio signal classification. As shown in FIG. 6, the device includes a receiving module 40, a tone obtaining module 41, a spectral tilt obtaining module 42, a classification module 43, a first judging module 44, a second judging module 45, a smoothing module 46, a first setting module 47 and a second setting module 48.

The receiving module 40 is configured to receive a current frame audio signal, where the current frame audio signal is an audio signal to be classified. The tone obtaining module 41 is configured to obtain a tonal characteristic parameter of the audio signal to be classified, where the tonal characteristic parameter of the audio signal to be classified is in at least one sub-band. The spectral tilt obtaining module 42 is configured to obtain a spectral tilt characteristic parameter of the audio signal to be classified. The classification module 43 is configured to judge a type of the audio signal to be classified according to the tonal characteristic parameter obtained by the tone obtaining module 41 and the spectral tilt characteristic parameter obtained by the spectral tilt obtaining module 42. The first judging module 44 is configured to judge whether a type of at least one previous frame audio signal of the audio signal to be classified is the same as a type of at least one corresponding next frame audio signal of the audio signal to be classified after the classification module 43 classifies the type of the audio signal to be classified. The second judging module 45 is configured to judge whether the type of the audio signal to be classified is different from the type of the at least one previous frame audio signal when the first judging module 44 determines that the type of the at least one previous frame audio signal of the audio signal to be classified is the same as the type of the at least one corresponding next frame audio signal of the audio signal to be classified. The smoothing module 46 is configured to perform smoothing processing on the audio signal to be classified when the second judging module 45 determines that the type of the audio signal to be classified is different from the type of the at least one previous frame audio signal. The first setting module 47 is configured to preset the stipulated number of frames for calculation during calculation of the tonal characteristic parameter. The second setting module 48 is configured to preset the stipulated number of frames for calculation during calculation of the spectral tilt characteristic parameter.

The tone obtaining module 41 is configured to calculate the tonal characteristic parameter according to the number of tones of the audio signal to be classified, where the number of tones of the audio signal to be classified is in at least one sub-band, and the total number of tones of the audio signal to be classified.

In this embodiment, if the tonal characteristic parameter in at least one sub-band, where the tonal characteristic parameter in at least one sub-band is obtained by the tone obtaining module 41, is: a tonal characteristic parameter in a low-frequency sub-band and a tonal characteristic parameter in a relatively high-frequency sub-band, the classification module 43 includes a judging unit 431 and a classification unit 432.

The judging unit 431 is configured to judge whether the spectral tilt characteristic parameter of the audio signal is greater than a third coefficient when the tonal characteristic parameter of the audio signal to be classified, where the tonal characteristic parameter of the audio signal to be classified is in the low-frequency sub-band, is greater than a first coefficient, and the tonal characteristic parameter in the relatively high-frequency sub-band is smaller than a second coefficient. The classification unit 432 is configured to determine that the type of the audio signal to be classified is a voice type when the judging unit determines that the spectral tilt characteristic parameter of the audio signal to be classified is greater than the third coefficient, and determine that the type of the audio signal to be classified is a music type when the judging unit determines that the spectral tilt characteristic parameter of the audio signal to be classified is not greater than the third coefficient.

Further, the tone obtaining module 41 in this embodiment includes a first calculation unit 411, a second calculation unit 412 and a tonal characteristic unit 413.

The first calculation unit 411 is configured to calculate an average value of the number of sub-band tones of the audio signal to be classified, where the average value of the number of sub-band tones of the audio signal to be classified is in at least one sub-band. The second calculation unit 412 is configured to calculate an average value of the total number of tones of the audio signal to be classified. The tonal characteristic unit 413 is configured to respectively use a ratio between the average value of the number of sub-band tones in at least one sub-band and the average value of the total number of tones as a tonal characteristic parameter of the audio signal to be classified, where the tonal characteristic parameter of the audio signal to be classified is in the corresponding sub-band.

The calculating, by the first calculation unit 411, the average value of the number of sub-band tones of the audio signal to be classified, where the average value of the number of sub-band tones of the audio signal to be classified is in at least one sub-band includes: calculating the average value of the number of sub-band tones in one sub-band according to a relationship between the stipulated number of frames for calculation, where the stipulated number of frames for calculation is set by the first setting module 47, and a frame number of the audio signal to be classified.

The calculating, by the second calculation unit 412, the average value of the total number of tones of the audio signal to be classified includes: calculating the average value of the total number of tones according to the relationship between the stipulated number of frames for calculation, where the stipulated number of frames for calculation is set by the first setting module 47, and the frame number of the audio signal to be classified.

Further, in this embodiment, the spectral tilt obtaining module 42 includes a third calculation unit 421 and a spectral tilt characteristic unit 422.

The third calculation unit 421 is configured to calculate a spectral tilt average value of the audio signal to be classified. The spectral tilt characteristic unit 422 is configure to use a mean-square error between the spectral tilt of at least one audio signal and the spectral tilt average value as the spectral tilt characteristic parameter of the audio signal to be classified.

The calculating, by the third calculation unit 421, the spectral tilt average value of the audio signal to be classified includes: calculating the spectral tilt average value according to the relationship between the stipulated number of frames for calculation, where the stipulated number of frames for calculation is set by the second setting module 48, and the frame number of the audio signal to be classified.

The calculating, by the spectral tilt characteristic unit 422, the mean-square error between the spectral tilt of at least one audio signal and the spectral tilt average value includes: calculating the spectral tilt characteristic parameter according to the relationship between the stipulated number of frames for calculation, where the stipulated number of frames for calculation is set by the second setting module 48, and the frame number of the audio signal to be classified.

The first setting module 47 and the second setting module 48 in this embodiment may be implemented through a program or a module, or the first setting module 47 and the second setting module 48 may even set the same stipulated number of frames for calculation.

The solution provided in this embodiment has the following beneficial effects: easy classification, low complexity and a small calculation amount; no extra delay is introduced to an encoder, and requirements of real-time encoding and low complexity of a voice/audio encoder during a classification process under mid-to-low bit rates are satisfied.

The embodiments of the present invention is mainly applied to the fields of communications technologies, and implements fast, accurate and real-time type classification of audio signals. With the development of network technologies, the embodiments of the present invention may be applied to other scenarios in the field, and may also be used in other similar or close fields of technologies.

Through the description of the preceding embodiments, persons skilled in the art may clearly understand that the present invention may certainly be implemented by hardware, but more preferably in most cases, may be implemented by software on a necessary universal hardware platform. Based on such understanding, the technical solution of the present invention or the part that makes contributions to the prior art may be substantially embodied in the form of a software product. The computer software product may be stored in a readable storage medium, for example, a floppy disk, hard disk, or optical disk of the computer, and contain several instructions used to instruct an encoder to implement the method according to the embodiments of the present invention.

The foregoing is only the specific implementations of the present invention, but the protection scope of the present invention is not limited here. Any change or replacement that can be easily figured out by persons skilled in the art within the technical scope disclosed by the present invention shall be covered by the protection scope of the present invention. Therefore, the protection scope of the present invention shall be subject to the protection scope of the claims.

What is claimed is:

1. A method for audio signal classification, comprising:

obtaining, by a computer, a tonal characteristic parameter of an audio signal to be classified, wherein the tonal characteristic parameter of the audio signal to be classified includes a tonal characteristic parameter in a low-frequency sub-band of the audio signal to be classified and a tonal characteristic parameter in a relatively high-frequency sub-band of the audio signal to be classified; wherein the tonal characteristic parameter is a ratio between a number of tones in at least one sub-band and a total number of tones of the audio signal to be classified;

determining, according to the obtained tonal characteristic parameter, a type of the audio signal to be classified; wherein the determining, according to the obtained tonal characteristic parameter, the type of the audio signal to be classified comprises:

judging whether the tonal characteristic parameter in the low-frequency sub-band is greater than a first coefficient, and whether the tonal characteristic parameter in the relatively high-frequency sub-band is smaller than a second coefficient;

if the tonal characteristic parameter in the low-frequency sub-band is greater than the first coefficient, and the tonal characteristic parameter in the relatively high-frequency sub-band is smaller than the second coefficient, determining that the type of the audio signal to be classified is a voice type;

if the tonal characteristic parameter in the low-frequency sub-band is not greater than the first coefficient, or the tonal characteristic parameter in the relatively high-frequency sub-band is not smaller than the second coefficient, determining that the type of the audio signal to be classified is a music type; and obtaining a spectral tilt characteristic parameter of the audio signal to be classified;

wherein the determining, according to the obtained tonal characteristic parameter, the type of the audio signal to be classified comprises:

determining, according to the obtained tonal characteristic parameter and the obtained spectral tilt characteristic parameter, the type of the audio signal to be classified; and wherein the obtaining the spectral tilt characteristic parameter of the audio signal to be classified comprises:

calculating a spectral tilt average value of the audio signal to be classified; and using a mean-square error between a spectral tilt of at least one audio signal and the spectral tilt average value as the spectral tilt characteristic parameter of the audio signal to be classified.

2. The method for audio signal classification according to claim 1, comprising:

presetting a stipulated number of frames for calculation, wherein the calculating the spectral tilt average value of the audio signal to be classified comprises: calculating the spectral tilt average value according to a relationship between the stipulated number of frames for calculation and a frame number of the audio signal to be classified.

3. The method for audio signal classification according to claim 1, comprising:

presetting a stipulated number of frames for calculation, wherein the mean-square error between the spectral tilt of at least one audio signal and the spectral tilt average value comprises: calculating the spectral tilt characteristic parameter according to the stipulated number of frames for calculation and the frame number of the audio signal to be classified.

4. A device for audio signal classification, comprising:

a tone obtaining module, configured to obtain a tonal characteristic parameter of an audio signal to be classified, wherein the tonal characteristic parameter of the audio signal to be classified is in at least one sub-band and includes a tonal characteristic parameter in a low-frequency sub-band of the audio signal to be classified and a tonal characteristic parameter in a relatively high-frequency sub-band of the audio signal to be classified; wherein the tonal characteristic parameter is a ratio between a number of tones in at least one sub-band and a total number of tones of the audio signal to be classified;

a classification module, configured to determine, according to the obtained tonal characteristic parameter, a type of the audio signal to be classified; wherein the classification module comprises:

a judging unit, configured to judge whether the tonal characteristic parameter in the low-frequency sub-band is greater than a first coefficient and whether the tonal characteristic parameter in the relatively high-frequency sub-band is smaller than a second coefficient; and a classification unit, configured to determine that the type of audio signal to be classified is a voice type when the judging unit determines that the tonal characteristic parameter in the low-frequency sub-band is greater than the first coefficient, and the tonal characteristic parameter in the relatively high-frequency sub-band is smaller than the second coefficient and determine that the type of the audio signal to be classified is a music type when the judging unit determines that the tonal characteristic parameter in the low-frequency sub-band is not greater than the first coefficient, or the tonal characteristic parameter in the relatively high-frequency sub-band is not smaller than the second coefficient; and a spectral tilt obtaining module, configured to obtain a spectral tilt characteristic parameter of the audio signal to be classified wherein the spectral tilt obtaining module comprises:

a third calculation unit, configured to calculate a spectral tilt average value of the audio signal to be classified; and a spectral tilt characteristic unit, configured to respectively use a mean-square error between a spectral tilt of at least one audio signal and the spectral tilt average value as the spectral tilt characteristic parameter of the audio signal to be classified;

wherein the classification module is further configured to confirm, according to the spectral tilt characteristic parameter obtained by the spectral tilt obtaining module, the determined type of the audio signal to be classified.

5. The device for audio signal classification according to claim 4, further comprising:

a second setting module, configured to preset a stipulated number of frames for calculation, wherein the calculating, by the third calculation unit, the spectral tilt average value of the audio signal to be classified comprises: calculating the spectral tilt average value according to the relationship between the stipulated number of frames for calculation, wherein the stipulated number of frames for calculation is set by the second setting module, and the frame number of the audio signal to be classified.

6. The device for audio signal classification according to claim 4, further comprising:

a second setting module, configured to preset a stipulated number of frames for calculation, wherein the calculating, by the spectral tilt characteristic unit, the mean-square error between the spectral tilt of at least one audio signal and the spectral tilt average value comprises: calculating the spectral tilt characteristic parameter according to the relationship between the stipulated number of frames for calculation, wherein the stipulated number of frames for calculation is set by the second setting module, and the frame number of the audio signal to be classified.

7. A method for audio signal classification, comprising:

obtaining, by a computer, a tonal characteristic parameter in a low-frequency sub-band of the audio signal to be classified and a tonal characteristic parameter in a relatively high-frequency sub-band of the audio signal to be classified; wherein the tonal characteristic parameter is a ratio between a quantity of tones in at least one sub-band and a total quantity of tones of the audio signal to be classified;

obtaining a spectral tilt characteristic parameter of the audio signal to be classified;

judging whether the tonal characteristic parameter in the low-frequency sub-band is greater than a first coefficient, whether the tonal characteristic parameter in the relatively high-frequency sub-band is smaller than a second coefficient, and whether the spectral tilt characteristic parameter of the audio signal to be classified is greater than the third coefficient; and if the tonal characteristic parameter in the low-frequency sub-band is greater than a first coefficient, the tonal characteristic parameter in the relatively high-frequency sub-band is smaller than the second coefficient, and the spectral tilt characteristic parameter of the audio signal to be classified is greater than the third coefficient, determining that the type of the audio signal to be classified is a voice type;

if the tonal characteristic parameter in the low-frequency sub-band is not greater than the first coefficient, or the tonal characteristic parameter in the relatively high-frequency sub-band is not smaller than the second coefficient, or the spectral tilt characteristic parameter of the audio signal to be classified is not greater than the third coefficient, determining that the type of the audio signal to be classified is a music type;

wherein obtaining a spectral tilt characteristic parameter of the audio signal to be classified comprises:

calculating a spectral tilt average value of M frames audio signals, wherein the M is an integer lager than 1 and the M frames audio signals includes the audio signal to be classified; and using a mean-square error between each spectral tilt of the M frames audio signals and the spectral tilt average value as the spectral tilt characteristic parameter of the audio signal to be classified.

8. The method for audio signal classification according to claim 7, wherein the obtaining the tonal characteristic parameter in the low-frequency sub-band of the audio signal to be classified and the tonal characteristic parameter in the relatively high-frequency sub-band of the audio signal to be classified comprises:

calculating an average quantity of tones in the low-frequency sub-band among M frames audio signals, wherein the M is a integer lager than 1 and the M frames audio signals includes the audio signal to be classified;

calculating an average value of the total quantity of tones of the audio signal among M frames audio signals;

using the ratio between the average quantity of tones in the low-frequency sub-band and the average value of the total quantity of tones as the tonal characteristic parameter in the low-frequency sub-band of the audio signal to be classified;

calculating an average quantity of tones in the relatively high-frequency sub-band among M frames audio signals, wherein the M is an integer lager than 1 and the M frames audio signals includes the audio signal to be classified;

using the ratio between average quantity of tones in the relatively high-frequency sub-band and the average value of the total quantity of tones as the tonal characteristic parameter in the relatively high-frequency sub-band of the audio signal to be classified.

9. A method for audio signal classification implemented on a universal hardware platform, comprising:

obtaining, by a computer, a tonal characteristic parameter of an audio signal to be classified, wherein the tonal characteristic parameter of the audio signal to be classified is in at least one sub-band;

calculating a spectral tilt average value of the audio signal to be classified;

using a mean-square error between a spectral tilt of at least one audio signal and the spectral tilt average value as a spectral tilt characteristic parameter of the audio signal to be classified; and determining, according to the obtained tonal characteristic parameter and the spectral tilt characteristic parameter, a type of the audio signal to be classified.

10. The method for audio signal classification according to claim 9, wherein if the tonal characteristic parameter in at least one sub-band is: a tonal characteristic parameter in a low-frequency sub-band and a tonal characteristic parameter in a relatively high-frequency sub-band, the determining, according to the obtained characteristic parameter, the type of the audio signal to be classified comprises:

judging whether the tonal characteristic parameter of the audio signal to be classified, wherein the tonal characteristic parameter of the audio signal to be classified is in the low-frequency sub-band, is greater than a first coefficient, and whether the tonal characteristic parameter in the relatively high-frequency sub-band is smaller than a second coefficient; and if the tonal characteristic parameter of the audio signal to be classified, wherein the tonal characteristic parameter of the audio signal to be classified is in the low-frequency sub-band, is greater than the first coefficient, and the tonal characteristic parameter in the relatively high-frequency sub-band is smaller than the second coefficient, determining that the type of the audio signal to be classified is a voice type; if the tonal characteristic parameter of the audio signal to be classified, wherein the tonal characteristic parameter of the audio signal to be classified is in the low-frequency sub-band, is not greater than the first coefficient, or the tonal characteristic parameter in the relatively high-frequency sub-band is not smaller than the second coefficient, determining that the type of the audio signal to be classified is a music type.

11. The method for audio signal classification according to claim 9, wherein if the tonal characteristic parameter in at least one sub-band is: a tonal characteristic parameter in a low-frequency sub-band and a tonal characteristic parameter in a relatively high-frequency sub-band, the confirming, according to the obtained spectral tilt characteristic parameter, the determined type of the audio signal to be classified comprises:

when the tonal characteristic parameter of the audio signal to be classified, wherein the tonal characteristic parameter of the audio signal to be classified is in the low-frequency sub-band, is greater than a first coefficient, and the tonal characteristic parameter in the relatively high-frequency sub-band is smaller than a second coefficient, judging whether the spectral tilt characteristic parameter of the audio signal to be classified is greater than a third coefficient; and if the spectral tilt characteristic parameter of the audio signal to be classified is greater than the third coefficient, determining that the type of the audio signal to be classified is a voice type; if the spectral tilt characteristic parameter of the audio signal to be classified is not greater than the third coefficient, determining that the audio signal to be classified is a music type.

12. The method for audio signal classification according to claim 9, wherein the obtaining the tonal characteristic parameter of the audio signal to be classified, wherein the tonal characteristic parameter of the audio signal to be classified is in at least one sub-band comprises:

calculating the tonal characteristic parameter according to a number of tones of the audio signal to be classified, wherein the number of tones of the audio signal to be classified is in at least one sub-band, and a total number of tones of the audio signal to be classified.

13. The method for audio signal classification according to claim 12, wherein the calculating the tonal characteristic parameter according to the number of tones of the audio signal to be classified, wherein the number of tones of the audio signal to be classified is in at least one sub-band, and the total number of tones of the audio signal to be classified comprises:

calculating an average value of a number of sub-band tones of the audio signal to be classified, wherein the number of sub-band tones of the audio signal to be classified is in at least one sub-band;

calculating an average value of the total number of tones of the audio signal to be classified; and respectively using a ratio between the average value of the number of sub-band tones in at least one sub-band and the average value of the total number of tones as a tonal characteristic parameter of the audio signal to be classified, wherein the tonal characteristic parameter of the audio signal to be classified is in the corresponding sub-band.

14. The method for audio signal classification according to claim 13, comprising:

presetting a stipulated number of frames for calculation, wherein the calculating the average value of the number of sub-band tones of the audio signal to be classified, wherein the number of sub-band tones of the audio signal to be classified is in at least one sub-band, comprises:

calculating the average value of the number of sub-band tones in one sub-band according to a relationship between the stipulated number of frames for calculation and a frame number of the audio signal to be classified.

15. The method for audio signal classification according to claim 13, comprising: presetting a stipulated number of frames for calculation, wherein the calculating the average value of the total number of tones of the audio signal to be classified comprises:

calculating the average value of the total number of tones according to a relationship between the stipulated number of frames for calculation and a frame number of the audio signal to be classified.

16. The method for audio signal classification according to claim 9, comprising:

presetting a stipulated number of frames for calculation, wherein the calculating the spectral tilt average value of the audio signal to be classified comprises: calculating the spectral tilt average value according to a relationship between the stipulated number of frames for calculation and a frame number of the audio signal to be classified.

17. The method for audio signal classification according to claim 9, comprising:

presetting a stipulated number of frames for calculation, wherein the mean-square error between the spectral tilt of at least one audio signal and the spectral tilt average value comprises: calculating the spectral tilt characteristic parameter according to the stipulated number of frames for calculation and the frame number of the audio signal to be classified.

18. A device for audio signal classification, comprising:

a tone obtaining module, configured to obtain a tonal characteristic parameter of an audio signal to be classified, wherein the tonal characteristic parameter of the audio signal to be classified is in at least one sub-band;

a third calculation unit, configured to calculate a spectral tilt average value of the audio signal to be classified;

a spectral tilt characteristic unit, configured to respectively use a mean-square error between a spectral tilt of at least one audio signal and the spectral tilt average value as a spectral tilt characteristic parameter of the audio signal to be classified; and a classification module, configured to determine, according to the obtained tonal characteristic parameter and the spectral tilt characteristic parameter, a type of the audio signal to be classified.

19. The device for audio signal classification according to claim 18, wherein when the tonal characteristic parameter in at least one sub-band, wherein the tonal characteristic parameter in at least one sub-band is obtained by the tone obtaining module, is: a tonal characteristic parameter in a low-frequency sub-band and a tonal characteristic parameter in a relatively high-frequency sub-band, the classification module comprises:

a judging unit, configured to judge whether the tonal characteristic parameter of the audio signal to be classified, wherein the tonal characteristic parameter of the audio signal to be classified is in the low-frequency sub-band, is greater than a first coefficient, and whether the tonal characteristic parameter in the relatively high-frequency sub-band is smaller than a second coefficient; and a classification unit, configured to determine that the type of audio signal to be classified is a voice type when the judging unit determines that the tonal characteristic parameter of the audio signal to be classified, wherein the tonal characteristic parameter of the audio signal to be classified is in the low-frequency sub-band, is greater than the first coefficient, and the tonal characteristic parameter in the relatively high-frequency sub-band is smaller than the second coefficient, and determine that the type of the audio signal to be classified is a music type when the judging unit determines that the tonal characteristic parameter of the audio signal to be classified, wherein the tonal characteristic parameter of the audio signal to be classified is in the low-frequency sub-band, is not greater than the first coefficient, or the tonal characteristic parameter in the relatively high-frequency sub-band is not smaller than the second coefficient.

20. The device for audio signal classification according to claim 18, wherein when the tonal characteristic parameter in at least one sub-band, wherein the tonal characteristic parameter in at least one sub-band is obtained by the tone obtaining module, is: a tonal characteristic parameter in a low-frequency sub-band and a tonal characteristic parameter in a relatively high-frequency sub-band, the classification module comprises:

the judging unit is further configured to judge whether the spectral tilt characteristic parameter of the audio signal is greater than a third coefficient when the tonal characteristic parameter of the audio signal to be classified, wherein the tonal characteristic parameter of the audio signal to be classified is in the low-frequency sub-band, is greater than a first coefficient, and the tonal characteristic parameter in the relatively high-frequency sub-band is smaller than a second coefficient; and the classification unit is further configured to determine that the type of the audio signal to be classified is a voice type when the judging unit determines that the spectral tilt characteristic parameter of the audio signal to be classified is greater than the third coefficient, and determine that the type of the audio signal to be classified is a music type when the judging unit determines that the spectral tilt characteristic parameter of the audio signal to be classified is not greater than the third coefficient.

21. The device for audio signal classification according to claim 18, wherein the tone obtaining module calculates the tonal characteristic parameter according to a number of tones of the audio signal to be classified, wherein the number of tones of the audio signal to be classified is in at least one sub-band, and a total number of tones of the audio signal to be classified.

22. The device for audio signal classification according to claim 21, wherein the tone obtaining module comprises:

a first calculation unit, configured to calculate an average value of a number of sub-band tones of the audio signal to be classified, wherein the average value of the number of sub-band tones of the audio signal to be classified is in at least one sub-band;

a second calculation unit, configured to calculate an average value of the total number of tones of the audio signal to be classified; and a tonal characteristic unit, configured to respectively use a ratio between the average value of the number of sub-band tones in at least one sub-band and the average value of the total number of tones as a tonal characteristic parameter of the audio signal to be classified, wherein the tonal characteristic parameter of the audio signal to be classified is in the corresponding sub-band.

23. The device for audio signal classification according to claim 22, further comprising:

a first setting module, configured to preset a stipulated number of frames for calculation, wherein the calculating, by the first calculation unit, the average value of the number of sub-band tones of the audio signal to be classified, wherein the average value of the number of sub-band tones of the audio signal to be classified is in at least one sub-band, comprises:

calculating the average value of the number of sub-band tones in one sub-band according to a relationship between the stipulated number of the frames for calculation, wherein the stipulated number of the frames for calculation is set by the first setting module, and a frame number of the audio signal to be classified.

24. The device for audio signal classification according to claim 22, further comprising:

a first setting module, configured to preset a stipulated number of frames for calculation, wherein the calculating, by the second calculation unit, the average value of the total number of tones of the audio signal to be classified comprises:

calculating the average value of the total number of tones according to a relationship between the stipulated number of frames for calculation, wherein the stipulated number of the frames for calculation is set by the first setting module, and a frame number of the audio signal to be classified.

25. The device for audio signal classification according to claim 18, further comprising:

a second setting module, configured to preset a stipulated number of frames for calculation, wherein the calculating, by the third calculation unit, the spectral tilt average value of the audio signal to be classified comprises:

calculating the spectral tilt average value according to the relationship between the stipulated number of frames for calculation, wherein the stipulated number of frames for calculation is set by the second setting module, and the frame number of the audio signal to be classified.

26. The device for audio signal classification according to claim 18 further comprising:

a second setting module, configured to preset a stipulated number of frames for calculation, wherein the calculating, by the spectral tilt characteristic unit, the mean-square error between the spectral tilt of at least one audio signal and the spectral tilt average value comprises:

calculating the spectral tilt characteristic parameter according to the relationship between the stipulated number of frames for calculation, wherein the stipulated number of frames for calculation is set by the second setting module, and the frame number of the audio signal to be classified.

* * * * *

UNITED STATES PATENT AND TRADEMARK OFFICE

CERTIFICATE OF CORRECTION

PATENT NO. : 8,682,664 B2
APPLICATION NO. : 13/246485
DATED : March 25, 2014
INVENTOR(S) : Xu et al.

It is certified that error appears in the above-identified patent and that said Letters Patent is hereby corrected as shown below:

In the Claims

*Column 23, Claim 7, Line 44 "lager" should read --larger--.*

*Column 23, Claim 8, Line 59 "lager" should read --larger--.*

*Column 24, Claim 8, Line 3 "lager" should read --larger--.*

Signed and Sealed this
Second Day of September, 2014

Michelle K. Lee
*Deputy Director of the United States Patent and Trademark Office*